United States Patent
Wu et al.

(10) Patent No.: US 12,170,982 B2
(45) Date of Patent: Dec. 17, 2024

(54) METHOD AND DEVICE RELATED TO SPATIAL RELATION IN A NODE USED FOR WIRELESS COMMUNICATION

(71) Applicants: Keying Wu, Shanghai (CN); Xiaobo Zhang, Shanghai (CN)

(72) Inventors: Keying Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 334 days.

(21) Appl. No.: 17/726,551

(22) Filed: Apr. 22, 2022

(65) Prior Publication Data

US 2022/0264547 A1 Aug. 18, 2022

Related U.S. Application Data

(63) Continuation of application No. PCT/CN2021/078038, filed on Feb. 26, 2021.

(30) Foreign Application Priority Data

Feb. 27, 2020 (CN) .......................... 202010122593.4
Apr. 15, 2020 (CN) .......................... 202010293567.8

(51) Int. Cl.
*H04W 72/04* (2023.01)
*H04L 5/00* (2006.01)
(Continued)

(52) U.S. Cl.
CPC ......... *H04W 72/044* (2013.01); *H04L 5/0048* (2013.01); *H04W 72/21* (2023.01); *H04W 72/23* (2023.01)

(58) Field of Classification Search
CPC ... H04W 72/044; H04W 72/21; H04W 72/23; H04L 5/0048; H04L 5/0049; H04L 5/0023
(Continued)

(56) References Cited

U.S. PATENT DOCUMENTS

2020/0014510 A1  1/2020 Wu
2020/0053721 A1  2/2020 Cheng
(Continued)

FOREIGN PATENT DOCUMENTS

CN    110120859 A    8/2019
CN    110138429 A    8/2019
(Continued)

OTHER PUBLICATIONS

Nokia (R1-1910916, enhancements on Multi-beam Operation, Oct. 14-20, 2019) (Year: 2019).*
(Continued)

*Primary Examiner* — Maharishi V Khirodhar

(57) ABSTRACT

The present disclosure discloses a method and a device in a node for wireless communications. A first node receives a first information block; and operates first-type information in a first radio resource block. The first information block is used for determining a first radio resource set and K information units, K being a positive integer greater than 1; the first radio resource block belongs to the first radio resource set; the K information units respectively indicate K spatial relations; a first condition set is used for determining whether a spatial relation corresponding to the operation performed in the first radio resource block is related to the K information units; the first condition set is related to a first parameter. The method provided herein improves the reliability of transmission on physical layer control channel.

20 Claims, 15 Drawing Sheets

(51) Int. Cl.
    *H04W 72/044*     (2023.01)
    *H04W 72/21*     (2023.01)
    *H04W 72/23*     (2023.01)
    *H04W 76/00*     (2018.01)
    *H04W 88/08*     (2009.01)

(58) Field of Classification Search
    USPC ........................................................ 370/329
    See application file for complete search history.

(56) References Cited

U.S. PATENT DOCUMENTS

2020/0358577 A1     11/2020     Takeda
2022/0393840 A1*   12/2022     Määttanen ............ H04L 5/0026

FOREIGN PATENT DOCUMENTS

| | | |
|---|---|---|
| CN | 110460360 A | 11/2019 |
| CN | 110535601 A | 12/2019 |
| CN | 110690948 A | 1/2020 |
| CN | 110876059 A | 3/2020 |
| JP | 2020025215 A | 2/2020 |
| WO | 2018127181 A1 | 7/2018 |
| WO | 2019190377 A1 | 10/2019 |
| WO | 2020034569 A1 | 2/2020 |

OTHER PUBLICATIONS

ISR received in application No. PCT/CN2021/078038 dated Jun. 1, 2021.
CN202010122593.4 Notification to Grant Patent Right for Invention dated Jun. 6, 2022.
CN202010122593.4 First Office Action dated Jan. 25, 2022.
CN202010122593.4 First Search Report dated Jan. 18, 2022.
CN202010122593.4 Supplemental Search Report dated May 27, 2022.
CN202010293567.8 Notification to Grant Patent Right for Invention dated Apr. 8, 2022.
CN202010293567.8 First Search Report dated Mar. 31, 2022.
Intel Corporation "Clarification on the restriction of maximum SRS resource sets configuration for uplink beam management" 3GPP TSG RAN WG2 RL2 R2-1914578 Nov. 8, 2019.
First Search Report of Chinese patent application No. CN202010293567.8 dated Mar. 31, 2022.
Notification to Grant Patent Right for Invention of Chinese patent application No. CN202010293567.8 dated Apr. 8, 2022.
First Office Action of Chinese patent application No. CN202210649231.X dated Feb. 3, 2024.
First Search Report of Chinese patent application No. CN202210649231.X dated Feb. 1, 2024.

* cited by examiner

First condition subset $\begin{cases} \text{First parameter is not configured} \\ \text{A second-type signaling is received in first time window} \end{cases}$

FIG. 10

Second condition subset $\begin{cases} \text{First parameter is configured} \\ \text{K is no greater than P} \end{cases}$

FIG. 11

Third condition subset
{
First parameter is configured

K is greater than P

A second-type signaling is received in first time window
}

FIG. 12

Given reference signal resource —used for determining→ Spatial relation corresponding to an operation performed in given radio resource block
FIG. 16
Second information block —used for configuring→ First parameter
FIG. 17
Information unit#0 ··· Information unit#(K1-1)
⇓ ⇓
Resource sub-block#0 ··· Resource sub-block#(K1-1)
FIG. 18
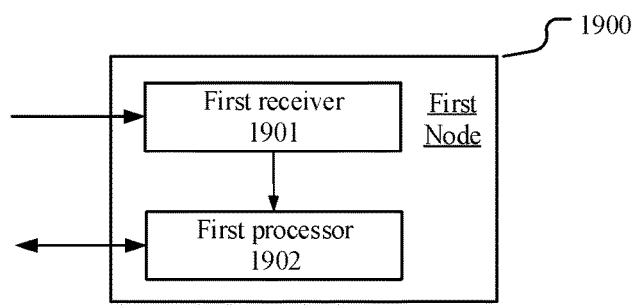
FIG. 19
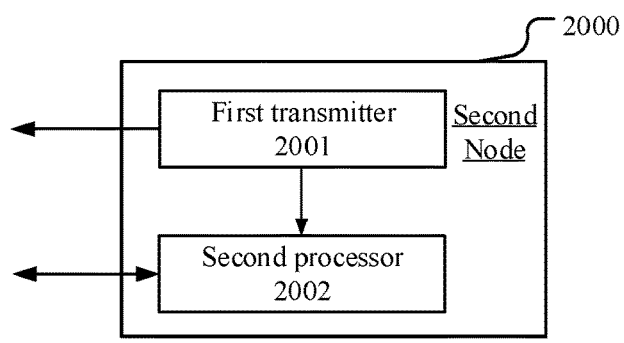
FIG. 20
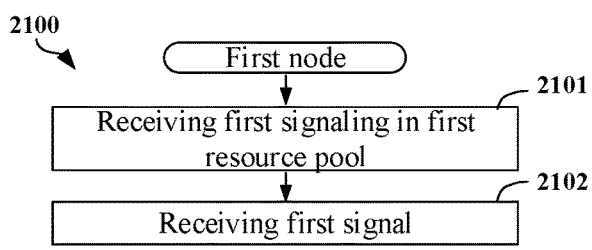
FIG. 21

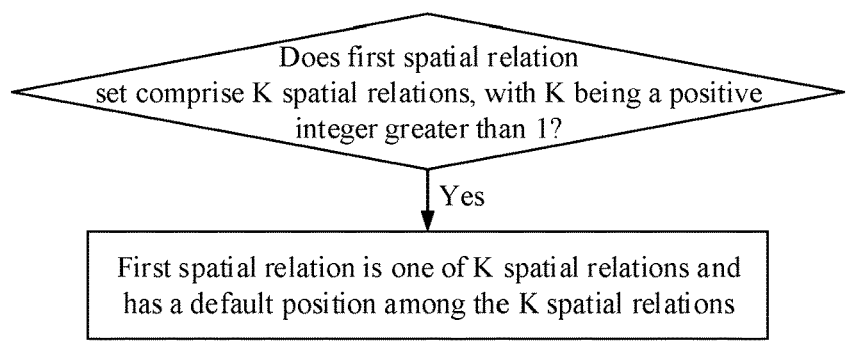
FIG. 26
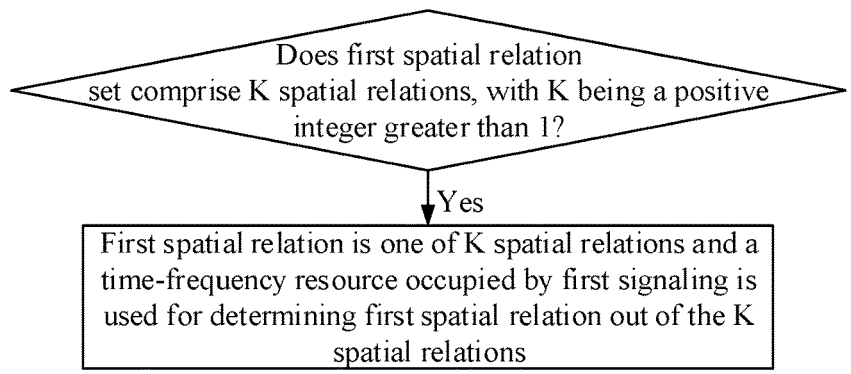
FIG. 27
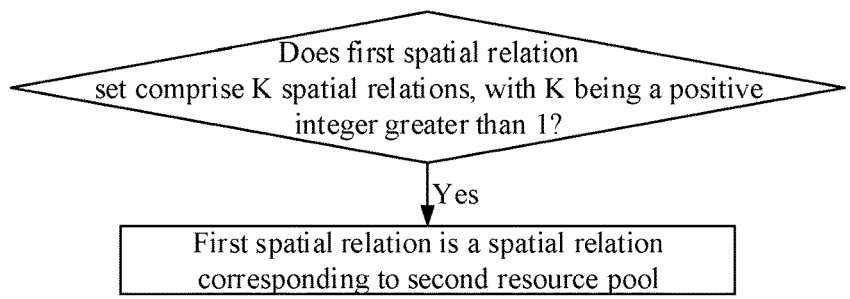
FIG. 28
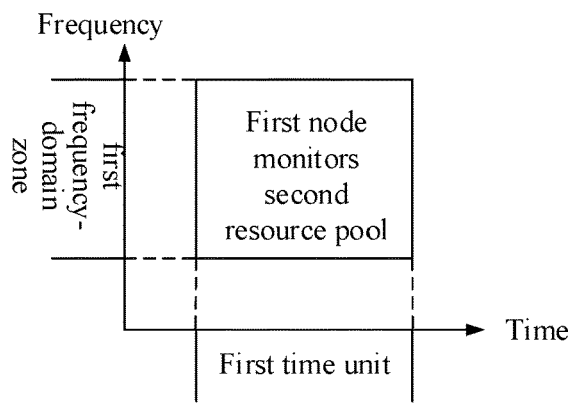
FIG. 29
First resource pool ←correspond to→ First spatial relation set
FIG. 30

First resource pool ⟷ correspond to ⟷ First spatial relation set

FIG. 31

Given resource pool ⟷ correspond to ⟷ Given spatial relation

FIG. 32

First signal ⟷ correspond to ⟷ Each spatial relation in second spatial relation set

FIG. 33

First information block —used for determining→ Number of spatial relations comprised by second spatial relation set

FIG. 34

First information block —used for determining→ Number of spatial relations comprised by second spatial relation set

FIG. 35

Time interval between first signaling and first signal ≥ First threshold

FIG. 36

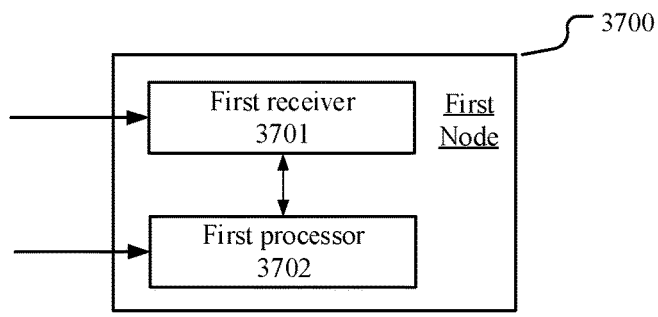

FIG. 37

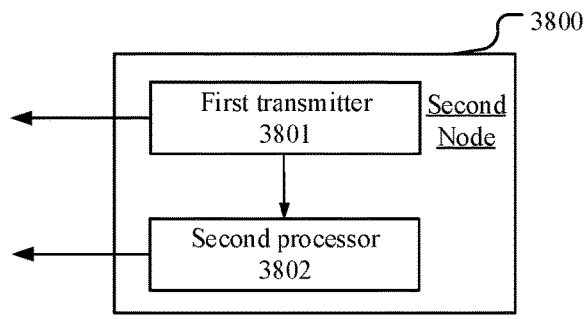

FIG. 38

METHOD AND DEVICE RELATED TO SPATIAL RELATION IN A NODE USED FOR WIRELESS COMMUNICATION

CROSS REFERENCE TO RELATED APPLICATIONS

This application is a continuation of International Application No. PCT/CN2021/078038, filed Feb. 26, 2021, claims the priority benefit of Chinese Patent Application No. 202010122593.4, filed on Feb. 27, 2020 and the priority benefit of Chinese Patent Application No. 202010293567.8, filed on Apr. 15, 2020, the full disclosure of which is incorporated herein by reference.

BACKGROUND

The present disclosure relates to transmission methods and devices in wireless communication systems, and in particular to a method and device of radio signal transmission in a wireless communication system that support cellular networks.

RELATED ART

As a key technique in both 3rd Generation Partner Project (3GPP) Long-term Evolution (LTE) and New Radio (NR) systems, MIMO is featured by configuring multiple antennas at the communication node, for instance, at a base station or a User Equipment (UE) to acquire extra spatial degrees of freedom. The multiple antennas form through beamforming a beam pointing in a specific direction to improve communication quality. When the antennas belong to multiple Transmitter Receiver Points (TRPs)/panels, the spatial differences among these TRPs/panels can be utilized to get extra diversity gains. Since the beam formed through beamforming of multiple antennas is usually narrow, beams from both sides of communication shall be aligned to enable effective communication. When UE mobility or other factors lead to the out-of-step of a transmitting/receiving beam, the communications will face a large decline in quality or even communication failure. So, beam management is proposed in NR Release (R) 15 and R16 for beam selection and updating between two communication sides, thus achieving performance gains brought by MIMO. In the meantime, a beam in a data channel can be indicated by a scheduling signaling or be associated with a beam of a default COntrol REsource SET (CORESET).

SUMMARY

In the NR R16, transmission based on multiple TRP/panels is introduced to enhance the transmission quality of downlink data channel. similarly, the transmission quality of a control channel can also be enhanced by transmission/reception of multiple TRP/panels. To address the problem, a solution is proposed in the present disclosure.

The scheme of transmission based on multiple TRP/panels will face further evolution and enhancement in NR R17 and following versions. And a major aspect of the scheme is to strengthen the transmission quality of physical layer control channel. on such basis, how to associate beams between a data channel and a control channel becomes an urgent problem that needs solving. To address the above problem, the present disclosure provides a solution.

It should be noted that though the present disclosure only took the multi-TRP/panel transmission and control channel transmission for example in the statement above, it is also applicable to other scenarios, such as single-TRP/panel transmission, Carrier Aggregation and V2X communications, as well as other physical layer channels, where similar technical effects can be achieved. Additionally, the adoption of a unified solution for various scenarios (including but not limited to multi-TRP/panel transmission, single-TRP/panel transmission, Carrier Aggregation and V2X communications, control channel transmission and transmissions of other physical layer channels) contributes to the reduction of hardcore complexity and costs. If no conflict is incurred, embodiments in a first node in the present disclosure and the characteristics of the embodiments are also applicable to a second node, and vice versa. And the embodiments in the present disclosure and the characteristics in the embodiments can be arbitrarily combined if there is no conflict.

The present disclosure provides a method in a first node for wireless communications, comprising:
  receiving a first information block; and
  operating first-type information in a first radio resource block;
  herein, the first information block is used for determining a first radio resource set and K information unitsunits, K being a positive integer greater than 1; the first radio resource block belongs to the first radio resource set; the K information unitsunits respectively indicate K spatial relations; a first condition set is used for determining whether a spatial relation corresponding to the operation performed in the first radio resource block is related to the K information unitsunits; the first condition set is related to a first parameter, and the first parameter is used for determining whether the first radio resource set corresponds to multiple spatial relations; the operating is monitoring, or the operating is transmitting.

In one embodiment, a problem to be solved in the present disclosure includes how to utilize multi-TRP/panel transmission to enhance transmission quality of a physical layer control channel. The method proposed above allows a radio resource carrying the control channel to have more than one activated spatial relations, thereby solving the problem.

In one embodiment, characteristics of the above method include that the K information units are used for determining a potential spatial relation in the first radio resource set, and the first condition set is used for determining a spatial relation actually employed by the first radio resource block.

In one embodiment, advantages of the above method include that a radio resource allowed to carry a control channel has multiple activated spatial relations, thus improving the transmission reliability of the physical layer control channel.

In one embodiment, advantages of the above method include that when the first radio resource set is configured with multiple spatial relations by a higher layer signaling, these spatial relations will not need to be activated by a Medium Access Control layer Control Element (MAC CE) signaling before taking effect, thus reducing delay and signaling overhead.

According to one aspect of the present disclosure, the above method is characterized in that the first condition set comprises M condition subsets, M being a positive integer greater than 1; when one condition subset in the first condition set is fulfilled, one or more information units of the K information units are used for determining the spatial relation corresponding to the operation performed in the first radio resource block; when none of condition subsets in the first condition set is fulfilled, a first reference signal resource is used for determining the spatial relation corresponding to the operation performed in the first radio resource block, and the first reference signal resource is unrelated to the K information units.

According to one aspect of the present disclosure, the above method is characterized in that the first condition set comprises a first condition subset, the first condition subset comprising that the first parameter is not configured and that a second-type signaling is received in a first time window; the second-type signaling is used for activating one of the K information units; the first radio resource block is used for determining the first time window.

According to one aspect of the present disclosure, the above method is characterized in that the first condition set comprises a second condition subset and a third condition subset; the second condition subset comprises that the first parameter is configured and that K is no greater than P; the third condition subset comprises that the first parameter is configured, K is greater than P and that a second-type signaling is received in a first time window; the first parameter indicates that the first radio resource set corresponds to P spatial relation(s), P being a positive integer; the second-type signaling is used for activating one of the K information units; the first radio resource block is used for determining the first time window.

In one embodiment, advantages of the above method include that on the premise that the second condition subset is fulfilled, multiple spatial relations configured by a higher layer signaling can directly take effect without being activated by the MAC CE signaling, thus reducing delay and signaling overhead incurred therein.

According to one aspect of the present disclosure, the above method is characterized in that the K information units respectively indicate K reference signal resource sets; the phrase that a given information unit is used for determining the spatial relation corresponding to the operation performed in the first radio resource block includes a meaning that: a reference signal resource in a reference signal resource set indicated by the given information unit is used for determining the spatial relation corresponding to the operation performed in the first radio resource block; the given information unit is one of the K information units.

According to one aspect of the present disclosure, the above method is characterized in comprising:

receiving a second information block;

herein, the second information block is used for configuring the first parameter.

According to one aspect of the present disclosure, the above method is characterized in that when K1 information units of the K information units are used for determining the spatial relation corresponding to the operation performed in the first radio resource block and K1 is a positive integer greater than 1, the first radio resource block is divided into K1 resource sub-blocks, and the K1 information units are used for respectively determining the spatial relation corresponding to the operation performed in the K1 resource sub-blocks.

According to one aspect of the present disclosure, the above method is characterized in that the first node is a UE.

According to one aspect of the present disclosure, the above method is characterized in that the first node is a relay node.

The present disclosure provides a method in a second node for wireless communications, comprising:

transmitting a first information block; and processing first-type information in a first radio resource block;

herein, the first information block is used for determining a first radio resource set and K information units, K being a positive integer greater than 1; the first radio resource block belongs to the first radio resource set; the K information units respectively indicate K spatial relations; a first condition set is used for determining whether a spatial relation corresponding to an operation performed in the first radio resource block is related to the K information units; the first condition set is related to a first parameter, and the first parameter is used for determining whether the first radio resource set corresponds to multiple spatial relations; the processing is transmitting, or the processing is receiving; when the processing is transmitting, the operating is monitoring, a target receiver of the first-type information monitors the first-type information in the first radio resource block; when the processing is receiving, the operating is transmitting, a transmitter of the first-type information transmits the first-type information in the first radio resource block.

According to one aspect of the present disclosure, the above method is characterized in that the first condition set comprises M condition subsets, M being a positive integer greater than 1; when one condition subset in the first condition set is fulfilled, one or more information units of the K information units are used for determining the spatial relation corresponding to the operation performed in the first radio resource block; when none of condition subsets in the first condition set is fulfilled, a first reference signal resource is used for determining the spatial relation corresponding to the operation performed in the first radio resource block, and the first reference signal resource is unrelated to the K information units.

According to one aspect of the present disclosure, the above method is characterized in that the first condition set comprises a first condition subset, the first condition subset comprising that the first parameter is not configured and that a second-type signaling is received in a first time window; the second-type signaling is used for activating one of the K information units; the first radio resource block is used for determining the first time window.

According to one aspect of the present disclosure, the above method is characterized in that the first condition set comprises a second condition subset and a third condition subset; the second condition subset comprises that the first parameter is configured and that K is no greater than P; the third condition subset comprises that the first parameter is configured, K is greater than P and that a second-type signaling is received in a first time window; the first parameter indicates that the first radio resource set corresponds to P spatial relation(s), P being a positive integer; the second-type signaling is used for activating one of the K information units; the first radio resource block is used for determining the first time window.

According to one aspect of the present disclosure, the above method is characterized in that the K information units respectively indicate K reference signal resource sets; the phrase that a given information unit is used for determining the spatial relation corresponding to the operation performed in the first radio resource block includes a meaning that: a reference signal resource in a reference signal resource set indicated by the given information unit is used for determining the spatial relation corresponding to the operation performed in the first radio resource block; the given information unit is one of the K information units.

According to one aspect of the present disclosure, the above method is characterized in comprising:

transmitting a second information block;

herein, the second information block is used for configuring the first parameter.

According to one aspect of the present disclosure, the above method is characterized in that when K1 information units of the K information units are used for determining the spatial relation corresponding to the operation performed in the first radio resource block and K1 is a positive integer greater than 1, the first radio resource block is divided into K1 resource sub-blocks, and the K1 information units are used for respectively determining the spatial relation corresponding to the operation performed in the K1 resource sub-blocks.

According to one aspect of the present disclosure, the above method is characterized in that the second node is a base station.

According to one aspect of the present disclosure, the above method is characterized in that the second node is a UE.

According to one aspect of the present disclosure, the above method is characterized in that the second node is a relay node.

The present disclosure provides a first node for wireless communications, comprising:

a first receiver, receiving a first information block; and a first processor, operating first-type information in a first radio resource block;

herein, the first information block is used for determining a first radio resource set and K information units, K being a positive integer greater than 1; the first radio resource block belongs to the first radio resource set; the K information units respectively indicate K spatial relations; a first condition set is used for determining whether a spatial relation corresponding to the operation performed in the first radio resource block is related to the K information units; the first condition set is related to a first parameter, and the first parameter is used for determining whether the first radio resource set corresponds to multiple spatial relations; the operating is monitoring, or the operating is transmitting.

The present disclosure provides a second node for wireless communications, comprising:

a first transmitter, transmitting a first information block; and a second processor, processing first-type information in a first radio resource block;

herein, the first information block is used for determining a first radio resource set and K information units, K being a positive integer greater than 1; the first radio resource block belongs to the first radio resource set; the K information units respectively indicate K spatial relations; a first condition set is used for determining whether a spatial relation corresponding to an operation performed in the first radio resource block is related to the K information units; the first condition set is related to a first parameter, and the first parameter is used for determining whether the first radio resource set corresponds to multiple spatial relations; the processing is transmitting, or the processing is receiving; when the processing is transmitting, the operating is monitoring, a target receiver of the first-type information monitors the first-type information in the first radio resource block; when the processing is receiving, the operating is transmitting, a transmitter of the first-type information transmits the first-type information in the first radio resource block.

The present disclosure provides a method in a first node for wireless communications, comprising:

receiving a first signaling in a first resource pool; and receiving a first signal;

herein, the first signaling indicates scheduling information of the first signal; the first resource pool corresponds to a first spatial relation set; the first signaling does not comprise a first field, the first field indicating a spatial relation corresponding to a signal scheduled by a signaling to which the first field belongs; the first signal corresponds to a first spatial relation, and a number of spatial relations comprised in the first spatial relation set is used for determining the first spatial relation.

In one embodiment, a problem to be solved in the present disclosure includes how to associate beams between a data channel and a control channel when multi-TRP/panel transmission is employed by a physical layer control channel. The method proposed herein proves to be a good solution by creating connections between the number of beams corresponding to the control channel and beams of the data channel.

In one embodiment, characteristics of the above method include that when the first signaling does not indicate a spatial relation corresponding to the first signal explicitly, how to determine the spatial relation corresponding to the first signal is related to the number of spatial relations corresponding to the first resource pool.

In one embodiment, advantages of the above method include realizing multi-TRP/panel transmission on the physical layer control channel and increasing the transmission reliability of the physical layer control channel.

In one embodiment, advantages of the above method include that the signaling overhead can be saved by implicitly indicating the spatial relation of a data channel.

According to one aspect of the present disclosure, the above method is characterized in that when the first spatial relation set comprises K spatial relations and K is a positive integer greater than 1, the first spatial relation is one of the K spatial relations; and the first spatial relation has a default position among the K spatial relations.

In one embodiment, advantages of the above method include that the signaling overhead can be reduced by implicitly indicating the first spatial relation.

According to one aspect of the present disclosure, the above method is characterized in that when the first spatial relation set comprises K spatial relations and K is a positive integer greater than 1, the first spatial relation is one of the K spatial relations; time-frequency resources occupied by the first signaling are used for determining the first spatial relation out of the K spatial relations.

In one embodiment, advantages of the above method include that the signaling overhead can be reduced by implicitly indicating the first spatial relation.

According to one aspect of the present disclosure, the above method is characterized in that when the first spatial relation set comprises K spatial relations and K is a positive integer greater than 1, the first spatial relation is a spatial relation corresponding to a second resource pool; the second resource pool corresponds to only one spatial relation, and time-frequency resources occupied by the first signal are used for determining the second resource pool.

In one embodiment, advantages of the above method include that the signaling overhead can be reduced by implicitly indicating the first spatial relation.

According to one aspect of the present disclosure, the above method is characterized in that the first signal corresponds to each spatial relation in a second spatial relation set, and the first spatial relation belongs to the second spatial relation set; a number of spatial relations comprised in the second spatial relation set is used for determining the first spatial relation.

According to one aspect of the present disclosure, the above method is characterized in comprising:

receiving a first information block;

herein, the first information block is used for determining the number of spatial relations comprised in the second spatial relation set.

According to one aspect of the present disclosure, the above method is characterized in that a time interval between the first signaling and the first signal is no smaller than a first threshold.

According to one aspect of the present disclosure, the above method is characterized in that the first node is a UE.

According to one aspect of the present disclosure, the above method is characterized in that the first node is a relay node.

The present disclosure provides a method in a second node for wireless communications, comprising:

transmitting a first signaling in a first resource pool; and transmitting a first signal;

herein, the first signaling indicates scheduling information of the first signal; the first resource pool corresponds to a first spatial relation set; the first signaling does not comprise a first field, the first field indicating a spatial relation corresponding to a signal scheduled by a signaling to which the first field belongs; the first signal corresponds to a first spatial relation, and a number of spatial relations comprised in the first spatial relation set is used for determining the first spatial relation.

According to one aspect of the present disclosure, the above method is characterized in that when the first spatial relation set comprises K spatial relations and K is a positive integer greater than 1, the first spatial relation is one of the K spatial relations; and the first spatial relation has a default position among the K spatial relations.

According to one aspect of the present disclosure, the above method is characterized in that when the first spatial relation set comprises K spatial relations and K is a positive integer greater than 1, the first spatial relation is one of the K spatial relations; time-frequency resources occupied by the first signaling are used for determining the first spatial relation out of the K spatial relations.

According to one aspect of the present disclosure, the above method is characterized in that when the first spatial relation set comprises K spatial relations and K is a positive integer greater than 1, the first spatial relation is a spatial relation corresponding to a second resource pool; the second resource pool corresponds to only one spatial relation, and time-frequency resources occupied by the first signal are used for determining the second resource pool.

According to one aspect of the present disclosure, the above method is characterized in that the first signal corresponds to each spatial relation in a second spatial relation set, and the first spatial relation belongs to the second spatial relation set; a number of spatial relations comprised in the second spatial relation set is used for determining the first spatial relation.

According to one aspect of the present disclosure, the above method is characterized in comprising:

transmitting a first information block;

herein, the first information block is used for determining the number of spatial relations comprised in the second spatial relation set.

According to one aspect of the present disclosure, the above method is characterized in that a time interval between the first signaling and the first signal is no smaller than a first threshold.

According to one aspect of the present disclosure, the above method is characterized in that the second node is a base station.

According to one aspect of the present disclosure, the above method is characterized in that the second node is a UE.

According to one aspect of the present disclosure, the above method is characterized in that the second node is a relay node.

The present disclosure provides a first node for wireless communications, comprising:

a first receiver, receiving a first signaling in a first resource pool; and a first processor, receiving a first signal;

herein, the first signaling indicates scheduling information of the first signal; the first resource pool corresponds to a first spatial relation set; the first signaling does not comprise a first field, the first field indicating a spatial relation corresponding to a signal scheduled by a signaling to which the first field belongs; the first signal corresponds to a first spatial relation, and a number of spatial relations comprised in the first spatial relation set is used for determining the first spatial relation.

The present disclosure provides a second node for wireless communications, comprising:

a first transmitter, transmitting a first signaling in a first resource pool; and a second processor, transmitting a first signal;

herein, the first signaling indicates scheduling information of the first signal; the first resource pool corresponds to a first spatial relation set; the first signaling does not comprise a first field, the first field indicating a spatial relation corresponding to a signal scheduled by a signaling to which the first field belongs; the first signal corresponds to a first spatial relation, and a number of spatial relations comprised in the first spatial relation set is used for determining the first spatial relation.

In one embodiment, the present disclosure is advantageous over the prior art in the following aspects:

The radio resource carrying a control channel is allowed to have multiple activated spatial relations simultaneously, hence an enhancement in the physical layer control channel's transmission reliability.

The multiple spatial relations configured by a higher layer signaling do not need to be activated by a MAC CE signaling, but instead, can be effective directly, thus reducing both delay and signaling overhead.

In one embodiment, the present disclosure is advantageous over the prior art in the following aspects:

Multi-TRP/panel transmission of the physical layer control channel is implemented, and consequently the transmission reliability of the physical layer control channel is improved.

The issue of association between beams of the data channel and the control channel when multi-TRP/panel transmission is employed in the physical layer control channel is figured out.

By implicitly indicating a spatial relation of the data channel, the signaling overhead can be reduced.

BRIEF DESCRIPTION OF THE DRAWINGS

Other features, objects and advantages of the present disclosure will become more apparent from the detailed description of non-restrictive embodiments taken in conjunction with the following drawings:

FIG. 10 illustrates a schematic diagram of a first condition subset according to one embodiment of the present disclosure.

FIG. 11 illustrates a schematic diagram of a second condition subset according to one embodiment of the present disclosure.

FIG. 12 illustrates a schematic diagram of a third condition subset according to one embodiment of the present disclosure.

FIG. 16 illustrates a schematic diagram of a given reference signal resource being used for determining a spatial relation corresponding to an operation performed in a given radio resource block according to one embodiment of the present disclosure.

FIG. 17 illustrates a schematic diagram of a second information block according to one embodiment of the present disclosure.

FIG. 18 illustrates a schematic diagram of relations among K1 information units and K1 resource sub-blocks according to one embodiment of the present disclosure.

FIG. 19 illustrates a structure block diagram of a processing device in a first node according to one embodiment of the present disclosure.

FIG. 20 illustrates a structure block diagram of a processing device in a second node according to one embodiment of the present disclosure.

FIG. 21 illustrates a flowchart of a first signaling and a first signal according to one embodiment of the present disclosure.

FIG. 26 illustrates a schematic diagram of a number of spatial relations comprised in a first spatial relation set being used for determining a first spatial relation according to one embodiment of the present disclosure.

FIG. 27 illustrates a schematic diagram of a number of spatial relations comprised in a first spatial relation set being used for determining a first spatial relation according to one embodiment of the present disclosure.

FIG. 28 illustrates a schematic diagram of a number of spatial relations comprised in a first spatial relation set being used for determining a first spatial relation according to one embodiment of the present disclosure.

FIG. 29 illustrates a schematic diagram of time-frequency resources occupied by a first signal being used for determining a second resource pool according to one embodiment of the present disclosure.

FIG. 30 illustrates a schematic diagram of a first resource pool corresponding to a first spatial relation set according to one embodiment of the present disclosure.

FIG. 31 illustrates a schematic diagram of a first resource pool corresponding to a first spatial relation set according to one embodiment of the present disclosure.

FIG. 32 illustrates a schematic diagram of a given resource pool corresponding to a given spatial relation according to one embodiment of the present disclosure.

FIG. 33 illustrates a schematic diagram of a first signal corresponding to each spatial relation in a second spatial relation set according to one embodiment of the present disclosure.

FIG. 34 illustrates a schematic diagram of a first information block according to one embodiment of the present disclosure.

FIG. 35 illustrates a schematic diagram of a first information block according to one embodiment of the present disclosure.

FIG. 36 illustrates a schematic diagram of a time interval between a first signaling and a first signal being no smaller than a first threshold according to one embodiment of the present disclosure.

FIG. 37 illustrates a structure block diagram of a processing device in a first node according to one embodiment of the present disclosure.

FIG. 38 illustrates a structure block diagram of a processing device in a second node according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
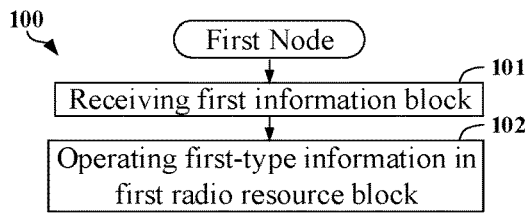
FIG. 1 illustrates a flowchart of a first information block and first-type information according to one embodiment of the present disclosure.

Embodiment 1 illustrates a flowchart of a first information block and first-type information according to one embodiment of the present disclosure, as shown in FIG. 1. In step 100 illustrated by FIG. 1, each box represents a step. Particularly, the sequence of steps marked by different boxes does not necessarily represent specific chronological orders of respective steps.

In Embodiment 1, the first node in the present disclosure receives a first information block in step 101; and operates first-type information in a first radio resource block in step 102. Herein, the first information block is used for determining a first radio resource set and K information units, K being a positive integer greater than 1; the first radio resource block belongs to the first radio resource set; the K information units respectively indicate K spatial relations; a first condition set is used for determining whether a spatial relation corresponding to the operation performed in the first radio resource block is related to the K information units; the first condition set is related to a first parameter, and the first parameter is used for determining whether the first radio resource set corresponds to multiple spatial relations; the operating is monitoring, or the operating is transmitting.

In one embodiment, the operating is monitoring; the first node monitors the first-type information in the first radio resource block, and the first condition set is used for determining whether the spatial relation corresponding to the monitoring performed in the first radio resource block is related to the K information units.

In one embodiment, the operating is transmitting; the first node transmits the first-type information in the first radio resource block, and the first condition set is used for determining whether the spatial relation corresponding to the transmitting performed in the first radio resource block is related to the K information units.

In one embodiment, the first information block is carried by a higher layer signaling.

In one embodiment, the first information block is carried by a Radio Resource Control (RRC) signaling.

In one embodiment, the first information block is transmitted in Downlink.

In one embodiment, the first information block is transmitted in SideLink.

In one embodiment, the first information block comprises a positive integer number of information bit(s).

In one embodiment, the first information block comprises information in all or part of fields of an Information Element (IE).

In one embodiment, the first information block comprises information in all or part of fields of a ControlResourceSet IE.

In one embodiment, the first information block comprises information in all or part of fields of a SearchSpace IE.

In one embodiment, the first information block comprises information in all or part of fields of a PDCCH-Config IE.

In one embodiment, the first information block comprises all or part of information in a controlResourceSetToAddModList field of a PDCCH-Config IE.

In one embodiment, the first information block comprises all or part of information in a searchSpacesToAddModList field of a PDCCH-Config IE.

In one embodiment, the first information block comprises information in all or part of fields of a PUCCH-Config IE.

In one embodiment, the first information block comprises all or part of information in a resourceSetToAddModList field of a PUCCH-Config IE.

In one embodiment, the first information block comprises all or part of information in a resourceToAddModList field of a PUCCH-Config IE.

In one embodiment, the first information block comprises all or part of information in a spatialRelationInfoToAddModList field of a PUCCH-Config IE.

In one embodiment, the first information block comprises information in all or part of fields of a PUCCH-Resource IE.

In one embodiment, the first information block comprises information in all or part of fields of a PUCCH-ResourceSet IE.

In one embodiment, the first information block comprises information in all or part of fields of a PUCCH-SpatialRelationInfo IE.

In one embodiment, the first information block comprises configuration information of the first radio resource set.

In one embodiment, the configuration information of the first radio resource set comprises one or more of a time-domain resource occupied, a frequency-domain resource occupied, a code-domain resource occupied, DeModulation Reference Signals (DMRS) scrambling sequence, a type of mapping of Control channel element (CCE) to Resource Element Group (REG), CCE aggregation level, a number of Physical Downlink Control Channel (PDCCH) candidates, a SearchSpace Type or a PDCCH format.

In one embodiment, the configuration information of the first radio resource set comprises one or more of a time-domain resource occupied, a frequency-domain resource occupied, a code-domain resource occupied, a low Peak-to-Average Power Ratio (PAPR) sequence, a pseudo-random sequence, a mapping mode, a cyclic shift, an Orthogonal Cover Code (OCC), an orthogonal sequence, or a Physical Uplink Control CHannel (PUCCH) format.

In one embodiment, any of the K information units comprises information in all or part of fields of an IE.

In one embodiment, any of the K information units is an IE.

In one embodiment, one of the K information units comprises information in all or part of fields of a Transmission Configuration Indicator (TCI)-State IE.

In one embodiment, any of the K information units comprises information in all or part of fields of a TCI-State IE.

In one embodiment, the K information units include a TCI-State IE.

In one embodiment, any of the K information units is a TCI-State IE.

In one embodiment, one of the K information units comprises information in all or part of fields of a PUCCH-SpatialRelationInfo IE.

In one embodiment, any of the K information units comprises information in all or part of fields of a PUCCH-SpatialRelationInfo IE.

In one embodiment, the K information units include a PUCCH-SpatialRelationInfo IE.

In one embodiment, any of the K information units is a PUCCH-SpatialRelationInfo IE.

In one embodiment, the K information units respectively correspond to K first-type indexes, and any one of the K first-type indexes is used for identifying a corresponding information unit.

In one embodiment, the K first-type indexes include a TCI-StateId.

In one embodiment, the K first-type indexes are respectively TCI-StateIds.

In one embodiment, the K first-type indexes include a PUCCH-SpatialRelationInfoId.

In one embodiment, the K first-type indexes are respectively PUCCH-SpatialRelationInfoIds.

In one embodiment, the first information block indicates the K information units.

In one embodiment, the first information block indicates a first-type index corresponding to each of the K information units.

In one embodiment, the first information block indicates that the first radio resource set is associated with the K information units.

In one embodiment, the first-type information comprises layer 1 (L1) information.

In one embodiment, the first-type information comprises control information.

In one embodiment, the first-type information comprises L1 control information.

In one embodiment, the first-type information comprises dynamic information.

In one embodiment, the first-type information comprises higher layer information.

In one embodiment, the first-type information comprises Downlink control information (DCI).

In one embodiment, the first-type information comprises information in one or more fields of a piece of DCI.

In one embodiment, the first-type information comprises Uplink control information (UCI).

In one embodiment, the first-type information comprises Hybrid Automatic Repeat reQuest-Acknowledgement (HARQ-ACK) information.

In one embodiment, the first-type information comprises a Scheduling Request (SR).

In one embodiment, the first-type information comprises Channel State Information (CSI).

In one embodiment, the first-type information comprises a Link Recovery Request (LRR).

In one embodiment, when the operating is monitoring, the first-type information comprises DCI; when the operating is transmitting, the first-type information comprises UCI.

In one embodiment, when the operating is monitoring, the first radio resource block comprises a positive integer number of PDCCH candidate(s), and the first-type information comprises DCI; when the operating is transmitting, the first radio resource block is a PUCCH resource, and the first-type information comprises UCI.

In one embodiment, the first-type information is carried by a dynamic signaling.

In one embodiment, the first-type information is carried by a L1 signaling.

In one embodiment, the first-type information is carried by a L1 control signaling.

In one embodiment, the first-type information is carried by an RRC signaling.

In one embodiment, the first-type information is carried by a MAC CE signaling.

In one embodiment, when the spatial relation corresponding to the operation performed in the first radio resource block is related to the K information units, one or more information units of the K information units are used for determining the spatial relation corresponding to the operation performed in the first radio resource block.

In one embodiment, if the spatial relation corresponding to the operation performed in the first radio resource block is related to the K information units, one or more information units of the K information units are used for determining the spatial relation corresponding to the operation performed in the first radio resource block.

In one embodiment, the first condition set comprises a positive integer number of condition(s).

In one embodiment, whether the first condition set is fulfilled is used for determining whether the spatial relation corresponding to the operation performed in the first radio resource block is related to the K information units.

In one embodiment, when the first condition set is fulfilled, the spatial relation corresponding to the operation performed in the first radio resource block is related to the K information units; when the first condition set is unfulfilled, the spatial relation corresponding to the operation performed in the first radio resource block is unrelated to the K information units.

In one embodiment, the first parameter is used for determining whether the first condition set includes receiving a second-type signaling in a first time window; the second-type signaling is used for activating one of the K information units, and the first radio resource block is used for determining the first time window.

In one embodiment, when each condition in the first condition set is fulfilled, the first condition set is fulfilled; when any condition in the first condition set is unfulfilled, the first condition set is unfulfilled.

In one embodiment, the meaning of the phrase that the first condition set is related to a first parameter includes that the first condition set is related to whether the first parameter is configured.

In one embodiment, the meaning of the phrase that the first condition set is related to a first parameter includes that when the first parameter is configured, the first condition set is related to the first parameter's value.

In one embodiment, the meaning of the phrase that the first condition set is related to a first parameter includes that a condition in the first condition set is the first parameter being configured.

In one embodiment, the meaning of the phrase that the first condition set is related to a first parameter includes that a condition in the first condition set is the first parameter not being configured.

In one embodiment, the meaning of the phrase that the first condition set is related to a first parameter includes that a condition in the first condition set is related to a number of the spatial relations corresponding to the first radio resource set indicated by the first parameter.

In one embodiment, the spatial relation includes a TCI state.

In one embodiment, the spatial relation includes Quasi co-located (QCL) assumption.

In one embodiment, the spatial relation includes a QCL parameter.

In one embodiment, the spatial relation includes a QCL relation.

In one embodiment, the spatial relation includes spatial setting.

In one embodiment, the spatial relation includes a Spatial Relation.

In one embodiment, the spatial relation includes SpatialRelationInfo.

In one embodiment, the spatial relation includes PUCCH-SpatialRelationInfo.

In one embodiment, the spatial relation includes a spatial domain filter.

In one embodiment, the spatial relation includes a spatial domain transmission filter.

In one embodiment, the spatial relation includes a spatial domain receive filter.

In one embodiment, the spatial relation includes a Spatial Tx parameter.

In one embodiment, the spatial relation includes a Spatial Rx parameter.

In one embodiment, the spatial relation includes large-scale properties.

In one embodiment, the monitoring refers to blind decoding, which means receiving a signal and performing decoding; if the decoding is determined to be correct according to a Cyclic Redundancy Check (CRC) bit, it is determined that the first-type information is received; otherwise, it is determined that the first-type information is not received.

In one embodiment, the monitoring refers to reception based on coherent detection, namely performing coherent reception and measuring energy of a signal obtained through the coherent reception; if the energy of the signal obtained through the coherent reception is greater than a first given threshold, it is determined that the first-type information is received; otherwise, the first-type information is not received.

In one embodiment, the monitoring refers to reception based on energy detection, namely sensing energy of a radio signal and averaging so as to acquire a received energy; if the received energy is greater than a second given threshold, it is determined that the first-type information is received; otherwise, it is determined that the first-type information is not received.

In one embodiment, the phrase of monitoring the first-type information in the first radio resource block includes the meaning that the first node determines according to CRC whether the first-type information is transmitted in the first radio resource block.

In one embodiment, the phrase of monitoring the first-type information in the first radio resource block includes the meaning that the first node determines according to coherent detection whether the first-type information is transmitted in the first radio resource block.

In one embodiment, the phrase of monitoring the first-type information in the first radio resource block includes the meaning that the first node determines according to energy detection whether the first-type information is transmitted in the first radio resource block.

Embodiment 2

Figure 2:
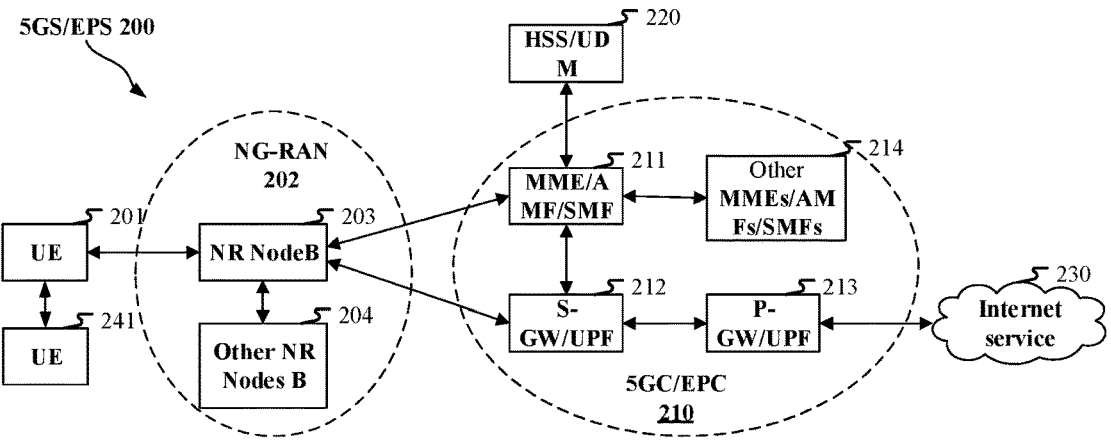
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2.

FIG. 2 is a diagram illustrating a network architecture 200 of Long-Term Evolution (LTE), and Long-Term Evolution Advanced (LTE-A) and future 5G systems. The network architecture 200 of LTE, LTE-A, and NR 5G may be called an Evolved Packet System (EPS) 200. 5G NR or LTE network architecture 200 can be called 5G System (5GS)/Evolved Packet System (EPS) 200 or other appliable terms. The 5GS/EPS 200 may comprise one or more UEs 201, a UE 241 in sidelink communication with the UE 201, an NG-RAN 202, a 5G-Core Network/Evolved Packet Core (5G-CN/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises operator-compatible IP services, specifically including Internet, Intranet, IP Multimedia Subsystem (IMS) and Packet Switching (PS) services.

In one embodiment, the first node in the present disclosure comprises the UE 201.

In one embodiment, the first node in the present disclosure comprises the UE 241.

In one embodiment, the second node in the present disclosure comprises the gNB203.

In one embodiment, the second node in the present disclosure comprises the UE 241.

In one embodiment, a radio link between the UE 201 and the gNB203 is a cellular link.

In one embodiment, a radio link between the UE 201 and the UE 241 is a Sidelink.

In one embodiment, a transmitter of the first information block in the present disclosure comprises the gNB203.

In one embodiment, a receiver of the first information block in the present disclosure comprises the UE201.

In one embodiment, a transmitter of the first-type information in the present disclosure comprises the UE201.

In one embodiment, a receiver of the first-type information in the present disclosure comprises the gNB203.

In one embodiment, a transmitter of the first-type information in the present disclosure comprises the gNB203.

In one embodiment, a receiver of the first-type information in the present disclosure comprises the UE201.

In one embodiment, the first node in the present disclosure comprises the UE201.

In one embodiment, the first node in the present disclosure comprises the UE 241.

In one embodiment, the second node in the present disclosure comprises the gNB203.

In one embodiment, the second node in the present disclosure comprises the UE 241.

In one embodiment, a radio link between the UE 201 and the gNB203 is a cellular link.

In one embodiment, a radio link between the UE 201 and the UE 241 is a Sidelink.

In one embodiment, a transmitter of the first signaling in the present disclosure comprises the gNB203.

In one embodiment, a receiver of the first signaling in the present disclosure comprises the UE201.

In one embodiment, a transmitter of the first signal in the present disclosure comprises the gNB203.

In one embodiment, a receiver of the first signal in the present disclosure comprises the UE201.

Embodiment 3

Figure 3:
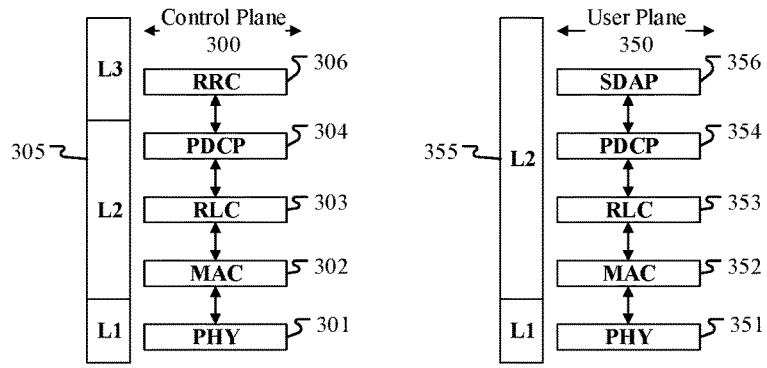
FIG. 3 illustrates a schematic diagram of a radio protocol architecture of a user plane and a control plane according to one embodiment of the present disclosure.

Embodiment 3 illustrates a schematic diagram of an embodiment of a radio protocol architecture of a user plane and a control plane according to the present disclosure, as shown in FIG. 3.

Embodiment 3 illustrates a schematic diagram illustrating a radio protocol architecture of a user plane and a control plane, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 305, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information block is generated by the RRC sublayer 306.

In one embodiment, the first-type information is generated by the PHY301, or by the PHY351.

In one embodiment, the first-type information is generated by the MAC sublayer 302, or by the MAC sublayer 352.

In one embodiment, the second information block is generated by the RRC sublayer 306.

In one embodiment, the second-type information is generated by the MAC sublayer 302, or by the MAC sublayer 352.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signaling is generated by the PHY301, or by the PHY351.

In one embodiment, the first signaling is generated by the MAC sublayer 302, or by the MAC sublayer 352.

In one embodiment, the first signal is generated by the PHY301, or by the PHY351.

In one embodiment, the first information block is generated by the RRC sublayer 306.

Embodiment 4

Figure 4:
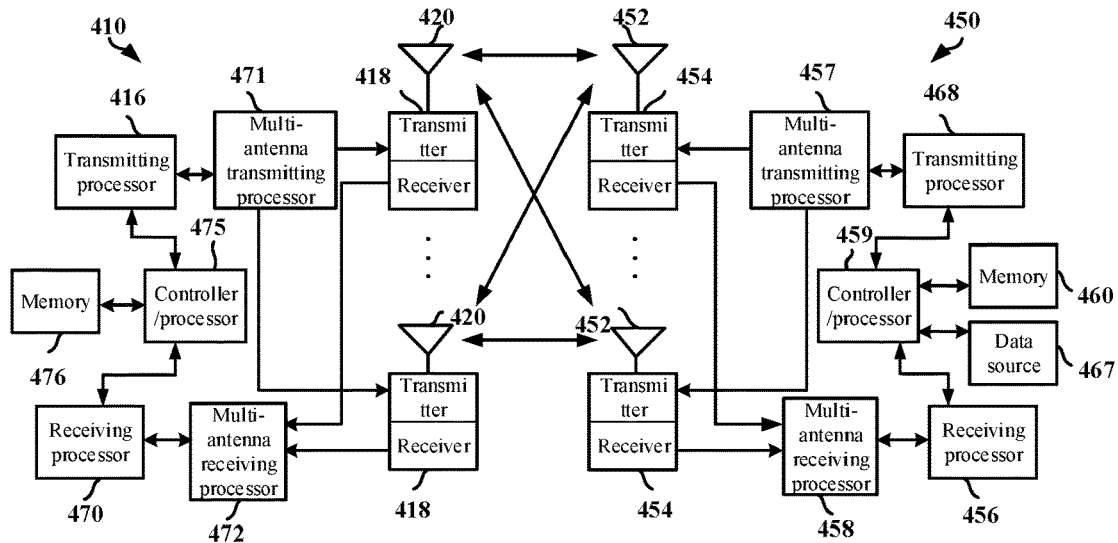
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 implements the functionality of the L2 layer. In DL, the controller/processor 475 provides header compression, encryption, packet segmentation and reordering, and multiplexing between a logical channel and a transport channel, and radio resource allocation of the second communication device 450 based on various priorities. The controller/processor 475 is also in charge of HARQ operation, a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and constellation mapping according to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more parallel streams. The transmitting processor 416 then maps each parallel stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In DL, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing. The controller/processor 459 is also in charge of error detection employing ACK and/or NACK protocols so as to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for HARQ operation, a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated parallel streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. The controller/processor 475 provides de-multiplexing between a transport channel and a logical channel, packet reassembling, decrypting, header decompression, control signal processing so as to recover a higher-layer packet from the second communication device 450. The higher-layer packet coming from the controller/processor 475 may be provided to the core network. The controller/processor 475 is also in charge of error detection employing ACK and/or NACK protocols so as to support HARQ operation.

In one embodiment, the second communication device 450 comprises at least one processor and at least one memory, the at least one memory comprises computer program codes; the at least one memory and the computer program codes are configured to be used in collaboration with the at least one processor, the second communication device 450 at least receives the first information block in the present disclosure; and operates the first-type information in the first radio resource block in the present disclosure. Herein, the first information block is used for determining a first radio resource set and K information units, K being a positive integer greater than 1; the first radio resource block belongs to the first radio resource set; the K information units respectively indicate K spatial relations; a first condition set is used for determining whether a spatial relation corresponding to the operation performed in the first radio resource block is related to the K information units; the first condition set is related to a first parameter, and the first parameter is used for determining whether the first radio resource set corresponds to multiple spatial relations; the operating is monitoring, or the operating is transmitting.

In one embodiment, the second communication device 450 comprises a memory that stores computer readable instruction program, the computer readable instruction program generates actions when executed by at least one processor, which include: receiving the first information block in the present disclosure; and operating the first-type information in the first radio resource block in the present disclosure. Herein, the first information block is used for determining a first radio resource set and K information units, K being a positive integer greater than 1; the first radio resource block belongs to the first radio resource set; the K information units respectively indicate K spatial relations; a first condition set is used for determining whether a spatial relation corresponding to the operation performed in the first radio resource block is related to the K information units; the first condition set is related to a first parameter, and the first parameter is used for determining whether the first radio resource set corresponds to multiple spatial relations; the operating is monitoring, or the operating is transmitting.

In one embodiment, the first communication device 410 comprises at least one processor and at least one memory, the at least one memory comprises computer program codes; the at least one memory and the computer program codes are configured to be used in collaboration with the at least one processor. The first communication device 410 at least transmits the first information block in the present disclosure; and processes the first-type information in the first radio resource block in the present disclosure. Herein, the first information block is used for determining a first radio resource set and K information units, K being a positive integer greater than 1; the first radio resource block belongs to the first radio resource set; the K information units respectively indicate K spatial relations; a first condition set is used for determining whether a spatial relation corresponding to an operation performed in the first radio resource block is related to the K information units; the first condition set is related to a first parameter, and the first parameter is used for determining whether the first radio resource set corresponds to multiple spatial relations; the processing is transmitting, or the processing is receiving; when the processing is transmitting, the operating is monitoring, a target receiver of the first-type information monitors the first-type information in the first radio resource block; when the processing is receiving, the operating is transmitting, a transmitter of the first-type information transmits the first-type information in the first radio resource block.

In one embodiment, the first communication device 410 comprises a memory that stores computer readable instruction program, the computer readable instruction program generates actions when executed by at least one processor, which include: transmitting the first information block in the present disclosure; and processing the first-type information in the first radio resource block in the present disclosure. Herein, the first information block is used for determining a first radio resource set and K information units, K being a positive integer greater than 1; the first radio resource block belongs to the first radio resource set; the K information units respectively indicate K spatial relations; a first condition set is used for determining whether a spatial relation corresponding to an operation performed in the first radio resource block is related to the K information units; the first condition set is related to a first parameter, and the first parameter is used for determining whether the first radio resource set corresponds to multiple spatial relations; the processing is transmitting, or the processing is receiving; when the processing is transmitting, the operating is monitoring, a target receiver of the first-type information monitors the first-type information in the first radio resource block; when the processing is receiving, the operating is transmitting, a transmitter of the first-type information transmits the first-type information in the first radio resource block.

In one embodiment, the first node in the present disclosure comprises the second communication device 450.

In one embodiment, the second node in the present disclosure comprises the first communication device 410.

In one embodiment, at least one of the antenna 452, the receiver 454, the receiving processor 456, the multi-antenna receiving processor 458, the controller/processor 459, the memory 460 or the data source 467 is used for receiving the first information block in the present disclosure; at least one of the antenna 420, the transmitter 418, the transmitting processor 416, the multi-antenna transmitting processor 471, the controller/processor 475 or the memory 476 is used for transmitting the first information block in the present disclosure.

In one embodiment, at least one of the antenna 420, the receiver 418, the receiving processor 470, the multi-antenna receiving processor 472, the controller/processor 475 or the memory 476 is used for receiving the first-type information in the first radio resource block in the present disclosure; at least one of the antenna 452, the transmitter 454, the transmitting processor 468, the multi-antenna transmitting processor 457, the controller/processor 459, the memory 460 or the data source 467 is used for transmitting the first-type information in the first radio resource block in the present disclosure.

In one embodiment, at least one of the antenna 452, the receiver 454, the receiving processor 456, the multi-antenna receiving processor 458, the controller/processor 459, the memory 460 or the data source 467 is used for monitoring the first-type information in the first radio resource block in the present disclosure; at least one of the antenna 420, the transmitter 418, the transmitting processor 416, the multi-antenna transmitting processor 471, the controller/processor 475 or the memory 476 is used for transmitting the first-type information in the first radio resource block in the present disclosure.

In one embodiment, at least one of the antenna 452, the receiver 454, the receiving processor 456, the multi-antenna receiving processor 458, the controller/processor 459, the memory 460 or the data source 467 is used for receiving the second information block in the present disclosure; at least one of the antenna 420, the transmitter 418, the transmitting processor 416, the multi-antenna transmitting processor 471, the controller/processor 475 or the memory 476 is used for transmitting the second information block in the present disclosure.

In one embodiment, the second communication device 450 comprises at least one processor and at least one memory, the at least one memory comprises computer program codes; the at least one memory and the computer program codes are configured to be used in collaboration with the at least one processor, the second communication device 450 at least receives the first signaling in the first resource pool; and receives the first signal. Herein, the first signaling indicates scheduling information of the first signal; the first resource pool corresponds to a first spatial relation set; the first signaling does not comprise a first field, the first field indicating a spatial relation corresponding to a signal scheduled by a signaling to which the first field belongs; the first signal corresponds to a first spatial relation, and a number of spatial relations comprised in the first spatial relation set is used for determining the first spatial relation.

In one embodiment, the second communication device 450 comprises a memory that stores computer readable instruction program, the computer readable instruction program generates actions when executed by at least one processor, which include: receiving the first signaling in the first resource pool; and receiving the first signal. Herein, the first signaling indicates scheduling information of the first signal; the first resource pool corresponds to a first spatial relation set; the first signaling does not comprise a first field, the first field indicating a spatial relation corresponding to a signal scheduled by a signaling to which the first field belongs; the first signal corresponds to a first spatial relation, and a number of spatial relations comprised in the first spatial relation set is used for determining the first spatial relation.

In one embodiment, the first communication device 410 comprises at least one processor and at least one memory, the at least one memory comprises computer program codes; the at least one memory and the computer program codes are configured to be used in collaboration with the at least one processor. The first communication device 410 at least transmits the first signaling in the first resource pool; and transmits the first signal. Herein, the first signaling indicates scheduling information of the first signal; the first resource pool corresponds to a first spatial relation set; the first signaling does not comprise a first field, the first field indicating a spatial relation corresponding to a signal scheduled by a signaling to which the first field belongs; the first signal corresponds to a first spatial relation, and a number of spatial relations comprised in the first spatial relation set is used for determining the first spatial relation.

In one embodiment, the first communication device 410 comprises a memory that stores computer readable instruction program, the computer readable instruction program generates actions when executed by at least one processor, which include: transmitting the first signaling in the first resource pool; and transmitting the first signal. Herein, the first signaling indicates scheduling information of the first signal; the first resource pool corresponds to a first spatial relation set; the first signaling does not comprise a first field, the first field indicating a spatial relation corresponding to a signal scheduled by a signaling to which the first field belongs; the first signal corresponds to a first spatial relation, and a number of spatial relations comprised in the first spatial relation set is used for determining the first spatial relation.

In one embodiment, at least one of the antenna 452, the receiver 454, the receiving processor 456, the multi-antenna receiving processor 458, the controller/processor 459, the memory 460 or the data source 467 is used for receiving the first signaling in the first resource pool; at least one of the antenna 420, the transmitter 418, the transmitting processor 416, the multi-antenna transmitting processor 471, the controller/processor 475 or the memory 476 is used for transmitting the first signaling in the first resource pool.

In one embodiment, at least one of the antenna 452, the receiver 454, the receiving processor 456, the multi-antenna receiving processor 458, the controller/processor 459, the memory 460 or the data source 467 is used for receiving the first signal; at least one of the antenna 420, the transmitter 418, the transmitting processor 416, the multi-antenna transmitting processor 471, the controller/processor 475 or the memory 476 is used for transmitting the first signal.

In one embodiment, at least one of the antenna 452, the receiver 454, the receiving processor 456, the multi-antenna receiving processor 458, the controller/processor 459, the memory 460 or the data source 467 is used for receiving the first information block; at least one of the antenna 420, the transmitter 418, the transmitting processor 416, the multi-antenna transmitting processor 471, the controller/processor 475 or the memory 476 is used for transmitting the first information block.

Embodiment 5

Figure 5:
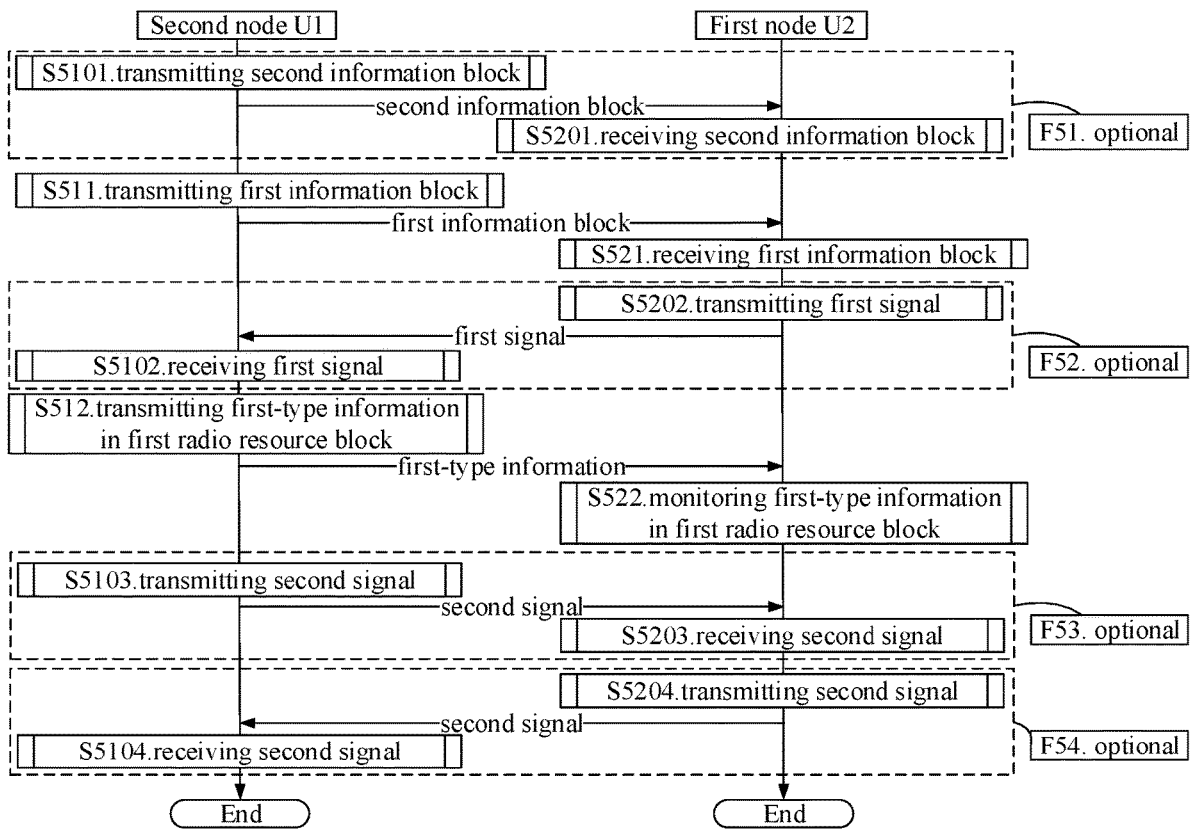
FIG. 5 illustrates a flowchart of wireless transmission according to one embodiment of the present disclosure.

Embodiment 5 illustrates a flowchart of wireless transmission according to one embodiment of the present disclosure, as shown in FIG. 5. In FIG. 5, a second node U1 and a first node U2 are communication nodes that transmit via an air interface. In FIG. 5, steps marked by boxes F51-F54 are optional, respectively. Steps in the box F53 and steps in the box F54 have an either-or relationship.

The second node U1 transmits a second information block in step S5101; transmits a first information block in step S511; and receives a first signal in step S5102; transmits first-type information in a first radio resource block in step S512; transmits a second signal in step S5103; and receives a second signal in step S5104.

The first node U2 receives a second information block in step S5201; receives a first information block in step S521; transmits a first signal in step S5202; monitors first-type information in a first radio resource block in step S522; receives a second signal in step S5203; and transmits a second signal in step S5204.

In Embodiment 5, the first information block is used by the first node U2 for determining a first radio resource set and K information units, K being a positive integer greater than 1; the first radio resource block belongs to the first radio resource set; the K information units respectively indicate K spatial relations; a first condition set is used by the first node U2 for determining whether a spatial relation corresponding to the operation performed in the first radio resource block is related to the K information units; the first condition set is related to a first parameter, and the first parameter is used by the first node U2 for determining whether the first radio resource set corresponds to multiple spatial relations.

In one embodiment, the first node U2 is the first node in the present disclosure.

In one embodiment, the second node U1 is the second node in the present disclosure.

In one embodiment, the air interface between the second node U1 and the first node U2 includes a wireless interface between a base station and a UE.

In one embodiment, the air interface between the second node U1 and the first node U2 includes a wireless interface between UEs.

In one embodiment, the processing is transmitting; the second node transmits the first-type information in the first radio resource block.

In one embodiment, if the processing is transmitting, the operating is monitoring, and a target receiver of the first-type information monitors the first-type information in the first radio resource block; if the processing is receiving, the operating is transmitting, and a transmitter of the first-type information transmits the first-type information in the first radio resource block.

In one embodiment, the first information block is transmitted on a downlink physical layer data channel (i.e., a downlink channel capable of carrying physical layer data).

In one embodiment, the first information block is transmitted on a Physical Downlink Shared CHannel (PDSCH).

In one embodiment, the first-type information is transmitted on a downlink physical layer control channel (i.e., a downlink channel only capable of carrying a physical layer signaling).

In one embodiment, the first-type information is transmitted on a PDCCH.

In one embodiment, when the operating is monitoring, the first-type information is transmitted on a PDCCH.

In one embodiment, steps marked by the box F51 in FIG. 5 exist; and the second information block is used to configure the first parameter.

In one embodiment, the second information block is transmitted on a PDSCH.

In one embodiment, steps marked by the F51 in FIG. 5 don't exist.

In one embodiment, steps marked by the box F52 in FIG. 5 exist; and the first signal is used to determine that the first information block is correctly received.

In one embodiment, the first signal is a baseband signal.

In one embodiment, the first signal is a radio signal.

In one embodiment, the first signal is a radio frequency (RF) signal.

In one embodiment, the first signal comprises HARQ-ACK.

In one embodiment, the first signal indicates that the first information block is correctly received.

In one embodiment, the first signal indicates that a radio signal carrying the first information block is correctly received.

In one embodiment, a start time of the first radio resource block is no earlier than an end time of a time-domain resource used for transmitting the first signal.

In one embodiment, a start of a time unit to which an earliest multicarrier symbol comprised by the first radio resource block belongs is no earlier than an end of a time unit to which a last multicarrier symbol used for transmitting the first signal belongs.

In one embodiment, a start of the first time window is no earlier than an end time of a time unit to which a last multicarrier symbol used for transmitting the first signal belongs.

In one embodiment, a time interval between a start of the first time window and an end time of a time unit to which a last multicarrier symbol used for transmitting the first signal belongs is a third time interval.

In one subembodiment, the third time interval is a non-negative real number.

In one subembodiment, the third time interval is measured by slots.

In one subembodiment, the third time interval is measured by a positive integer number of multicarrier symbol(s).

In one subembodiment, the third time interval is measured by ms.

In one subembodiment, the third time interval is equal to 0.

In one subembodiment, the third time interval is greater than 0.

In one subembodiment, the third time interval is fixed.

In one subembodiment, the third time interval is configured by an RRC signaling.

In one embodiment, the first signal is transmitted on a PUCCH.

In one embodiment, the first signal is transmitted on a Physical Uplink Shared CHannel (PUSCH).

In one embodiment, steps marked by the box F52 in FIG. 5 don't exist.

In one embodiment, steps marked by the box F53 in FIG. 5 exist, while steps marked by the box F54 in FIG. 5 don't exist; the operating is monitoring, and the first node receives the first signaling in the first radio resource block, the first signaling carries the first-type information, and the first signaling comprises scheduling information of the second signal.

In one embodiment, steps marked by the box F53 in FIG. 5 don't exist, while steps marked by the box F54 in FIG. 5 exist; the operating is monitoring; and the first node receives the first signaling in the first radio resource block, the first signaling carries the first-type information, and the first signaling comprises scheduling information of the second signal.

In one embodiment, the second signal is a baseband signal.

In one embodiment, the second signal is a radio signal.

In one embodiment, the second signal is an RF signal.

In one embodiment, the first signaling is a dynamic signaling.

In one embodiment, the first signaling is an L1 signaling.

In one embodiment, the first signaling is an L1 control signaling.

In one embodiment, the first signaling comprises DCI.

In one embodiment, the first signaling comprises one or more fields in a piece of DCI.

In one embodiment, the first signaling comprises one or more fields in a piece of Sidelink Control Information (SCI).

In one embodiment, the first signaling comprises DCI used for DownLink Grant.

In one embodiment, the first signaling comprises DCI used for UpLink Grant.

In one embodiment, the scheduling information comprises one or more of a time-domain resource occupied, a frequency-domain resource occupied, a Modulation and Coding Scheme (MCS), configuration information of DMRS, a HARQ process number, a Redundancy Version (RV) or a New Data Indicator (NDI).

In one embodiment, the second signal is transmitted on a PDSCH.

In one embodiment, the second signal is transmitted on a PUSCH.

In one embodiment, steps in neither of the box F53 and the box F54 in FIG. 5 exist.

Embodiment 6

Figure 6:
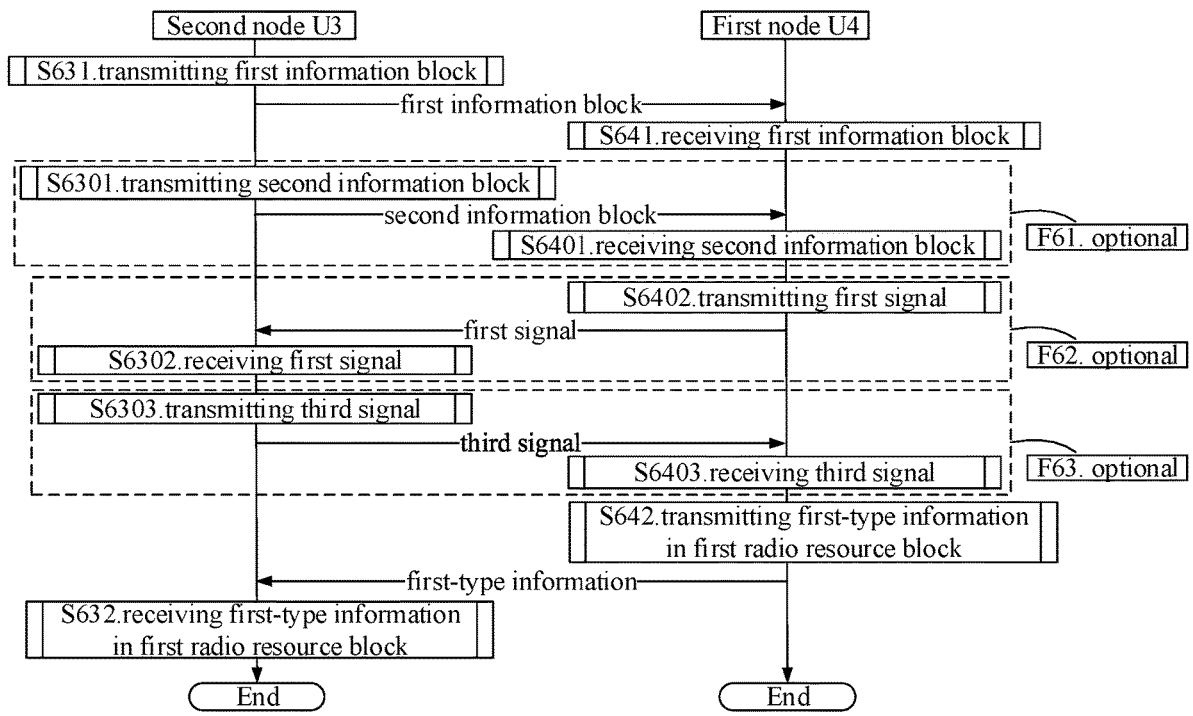
FIG. 6 illustrates a flowchart of wireless transmission according to one embodiment of the present disclosure.

Embodiment 6 illustrates a flowchart of wireless transmission according to one embodiment of the present disclosure, as shown in FIG. 6. In FIG. 6, a second node U3 and a first node U4 are communication nodes that transmit via an air interface. In FIG. 6, steps marked by the boxes F61-F63 are optional, respectively.

The second node U3 transmits a first information block in step S631; transmits a second information block in step S6301; and receives a first signal in step S6302; transmits a third signal in step S6303; and receives first-type information in a first radio resource block in step S632.

The first node U4 receives a first information block in step S641; receives a second information block in step S6401; and transmits a first signal in step S6402; receives a third signal in step S6403; and transmits first-type information in a first radio resource block in step S642.

In Embodiment 6, the first information block is used by the first node U4 for determining a first radio resource set and K information units, K being a positive integer greater than 1; the first radio resource block belongs to the first radio resource set; the K information units respectively indicate K spatial relations; a first condition set is used by the first node U4 for determining whether a spatial relation corresponding to the operation performed in the first radio resource block is related to the K information units; the first condition set is related to a first parameter, and the first parameter is used by the first node U4 for determining whether the first radio resource set corresponds to multiple spatial relations.

In one embodiment, the first node U4 is the first node in the present disclosure.

In one embodiment, the second node U3 is the second node in the present disclosure.

In one embodiment, the processing is receiving; the second node receives the first-type information in the first radio resource block.

In one embodiment, the first-type information is transmitted on an uplink physical layer control channel (i.e., an uplink channel only capable of carrying a physical layer signaling).

In one embodiment, the first-type information is transmitted on a PUCCH.

In one embodiment, when the operating is transmitting, the first-type information is transmitted on a PUCCH.

In one embodiment, steps marked by the box F63 in FIG. 6 exist; the operating is transmitting; the third signal is used for generating the first-type information.

In one embodiment, the third signal is a baseband signal.

In one embodiment, the third signal is a radio signal.

In one embodiment, the third signal is an RF signal.

In one embodiment, the third signal carries a first bit block, the first bit block being a Transport Block (TB), a Code Block (CB) or a Code Block Group (CBG); the first-type information indicates whether the first bit block is correctly received.

In one embodiment, the third signal is transmitted on a PDSCH.

In one embodiment, the third signal comprises a Channel State Information-Reference Signal (CSI-RS), and a measurement on the third signal is used for generating the first-type information; the first-type information comprises CSI.

In one embodiment, steps marked by the box F63 in FIG. 6 do not exist.

Embodiment 7

Figure 7:
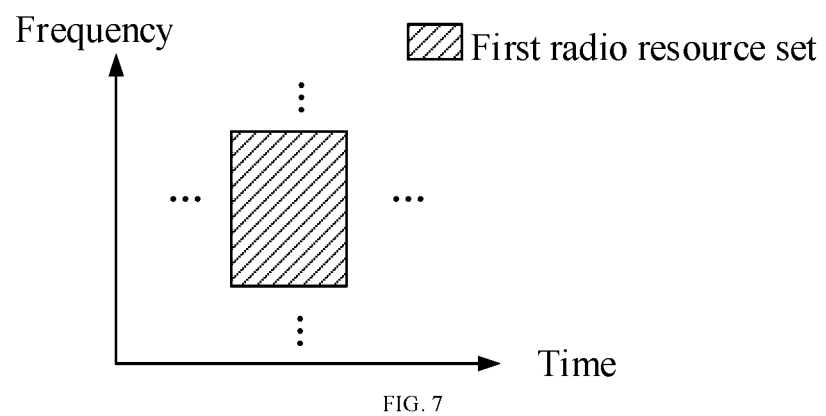
FIG. 7 illustrates a schematic diagram of a first radio resource set according to one embodiment of the present disclosure.

Embodiment 7 illustrates a schematic diagram of a first radio resource set according to one embodiment of the present disclosure; as shown in FIG. 7.

In one embodiment, the first radio resource set comprises a COntrol REsource SET (CORESET).

In one embodiment, the first radio resource set comprises a search space.

In one embodiment, the first radio resource set comprises a search space set.

In one embodiment, the first radio resource set comprises a PUCCH resource.

In one embodiment, the first radio resource set comprises a PUCCH resource set.

In one embodiment, the first radio resource set comprises a time-domain resource.

In one embodiment, the first radio resource set comprises a frequency-domain resource.

In one embodiment, the first radio resource set comprises a code-domain resource.

In one embodiment, the first radio resource set comprises a time-domain resource and a frequency-domain resource.

In one embodiment, the first radio resource set comprises a frequency-domain resource and a code-domain resource.

In one embodiment, the first radio resource set comprises a time-domain resource, a frequency-domain resource and a code-domain resource.

In one embodiment, the code-domain resource comprises one or more of a DMRS port, a DMRS CDM group, a pseudo-random sequence, a Zadoff-Chu sequence, low-PAPR (that is, Peak to Average Power Ratio) sequence, a cyclic shift, an OCC, an orthogonal sequence, a frequency-domain orthogonal sequence or a time-domain orthogonal sequence.

In one embodiment, the first radio resource set occupies a positive integer number of Resource Element(s) (RE(s)) in time-frequency domain.

In one embodiment, an RE occupies a multicarrier symbol in time domain and a subcarrier in frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the first radio resource set occupies a positive integer number of subcarrier(s) in frequency domain.

In one embodiment, the first radio resource set occupies a positive integer number of Physical Resource Block(s) (PRB(s)) in frequency domain.

In one embodiment, the first radio resource set occupies a positive integer number of consecutive PRBs in frequency domain.

In one embodiment, the first radio resource set occupies a positive integer number of non-consecutive PRBs in frequency domain.

In one embodiment, the first radio resource set occupies a positive integer number of multicarrier symbol(s) in time domain.

In one embodiment, the first radio resource set occupies a positive integer number of consecutive multicarrier symbols in time domain.

In one embodiment, the first radio resource set occupies a positive integer number of non-consecutive multicarrier symbols in time domain.

In one embodiment, the first radio resource set occupies a positive integer number of slot(s) in time domain.

In one embodiment, the first radio resource set occurs only once in time domain.

In one embodiment, the first radio resource set occurs multiple times in time domain.

In one embodiment, the first radio resource set occurs periodically in time domain.

In one embodiment, the first radio resource set occurs aperiodically in time domain.

In one embodiment, the phrase that the first radio resource block belongs to the first radio resource set includes the meaning that a frequency-domain resource occupied by the first radio resource block belongs to frequency-domain resources occupied by the first radio resource set.

In one embodiment, the phrase that the first radio resource block belongs to the first radio resource set includes the meaning that a code-domain resource occupied by the first radio resource block belongs to code-domain resources occupied by the first radio resource set.

In one embodiment, the phrase that the first radio resource block belongs to the first radio resource set includes the meaning that a time-domain resource occupied by the first radio resource block belongs to time-domain resources occupied by the first radio resource set.

In one embodiment, the phrase that the first radio resource block belongs to the first radio resource set includes the meaning that a time-frequency resource occupied by the first radio resource block belongs to time-frequency resources occupied by the first radio resource set.

In one embodiment, the phrase that the first radio resource block belongs to the first radio resource set includes the meaning that a frequency-domain resource and a code-domain resource occupied by the first radio resource block respectively belong to frequency-domain resources and code-domain resources occupied by the first radio resource set.

In one embodiment, the first radio resource block is an occurrence of the first radio resource set in time domain.

In one embodiment, the first radio resource block comprises a positive integer number of PDCCH candidate(s).

In one embodiment, the first radio resource block comprises a positive integer number of PDCCH candidate(s) in a same PDCCH monitoring occasion.

In one embodiment, the first radio resource block comprises a PUCCH resource.

In one embodiment, the first radio resource block comprises a time-domain resource and a frequency-domain resource.

In one embodiment, the first radio resource block comprises a time-domain resource, a frequency-domain resource and a code-domain resource.

In one embodiment, the first radio resource block occupies a positive integer number of RE(s) in time-frequency domain.

In one embodiment, the first radio resource block occupies a positive integer number of subcarrier(s) in frequency domain.

In one embodiment, the first radio resource block occupies a positive integer number of PRB(s) in frequency domain.

In one embodiment, the first radio resource block occupies a positive integer number of multicarrier symbol(s) in time domain.

Embodiment 8

Figure 8:
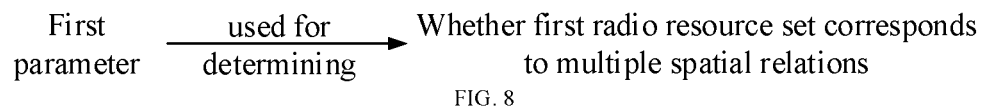
FIG. 8 illustrates a schematic diagram of a first parameter according to one embodiment of the present disclosure.

Embodiment 8 illustrates a schematic diagram of a first parameter according to one embodiment of the present disclosure; as shown in FIG. 8. In Embodiment 8, the first parameter is used for determining whether the first radio resource set corresponds to multiple spatial relations.

In one embodiment, the first parameter is a higher layer parameter.

In one embodiment, the first parameter is configured by a higher layer signaling.

In one embodiment, the first parameter is configured by an RRC signaling.

In one embodiment, the first parameter is configured by a MAC CE signaling.

In one embodiment, the first parameter is semi-statically configured.

In one embodiment, the first parameter comprises all or part of information in a higher layer RepSchemeEnabler.

In one embodiment, the first parameter indicates whether the first radio resource set corresponds to multiple spatial relations.

In one embodiment, the first parameter explicitly indicates whether the first radio resource set corresponds to multiple spatial relations.

In one embodiment, the first parameter implicitly indicates whether the first radio resource set corresponds to multiple spatial relations.

In one embodiment, the first parameter indicates whether the first radio resource set corresponds to two spatial relations.

In one embodiment, if the first parameter is configured, the first radio resource set corresponds to multiple spatial relations.

In one embodiment, if the first parameter is configured, the first radio resource set corresponds to two spatial relations.

In one embodiment, if the first parameter is not configured, the first radio resource set only corresponds to one spatial relation.

In one embodiment, the first parameter indicates the number of the spatial relations corresponding to the first radio resource set.

In one embodiment, the phrase of whether the first radio resource set corresponds to multiple spatial relations includes whether the first radio resource set can correspond to multiple spatial relations that are activated at the same time.

In one embodiment, the phrase of whether the first radio resource set corresponds to multiple spatial relations includes whether the first-type information can be transmitted by multiple different antenna ports in the first radio resource set.

In one embodiment, the phrase of whether the first radio resource set corresponds to multiple spatial relations includes whether the first-type information can be repeatedly transmitted by multiple different antenna ports in the first radio resource set.

In one embodiment, a channel that a radio signal transmitted from one antenna port goes through can be used to infer a channel that another radio signal transmitted from the antenna port goes through.

In one embodiment, a channel that a radio signal transmitted from one antenna port goes through cannot be used to infer a channel that another radio signal transmitted from the antenna port goes through.

In one embodiment, the phrase of whether the first radio resource set corresponds to multiple spatial relations includes whether the first-type information can be transmitted by multiple different antenna port groups in the first radio resource set.

In one embodiment, the phrase of whether the first radio resource set corresponds to multiple spatial relations includes whether the first-type information can be repeatedly transmitted by multiple different antenna port groups in the first radio resource set.

In one embodiment, any antenna port group of the multiple different antenna port groups comprises a positive integer number of antenna port(s).

In one embodiment, any two antenna ports that belong to different antenna port groups among the multiple antenna port groups cannot be assumed as QCL.

In one embodiment, any two antenna ports that belong to different antenna port groups among the multiple antenna port groups cannot be assumed as QCL, with a corresponding QCL type being QCL-TypeD.

In one embodiment, the phrase of whether the first radio resource set corresponds to multiple spatial relations includes whether the first-type information can be received in the first radio resource set by multiple different spatial Rx parameters.

In one embodiment, the phrase of whether the first radio resource set corresponds to multiple spatial relations includes the meaning that whether the first-type information can be received in the first radio resource set by multiple different spatial domain filters.

In one embodiment, the first parameter indicates that the first-type information can be transmitted by multiple different antenna ports in the first radio resource set, and also indicates a mode of multiplexing between the multiple different antenna ports.

In one embodiment, the first parameter indicates that the first-type information can be transmitted by multiple different antenna port groups in the first radio resource set, and also indicates a mode of multiplexing between the multiple different antenna port groups.

In one embodiment, the first parameter indicates that the first-type information can be transmitted by multiple different spatial domain filters in the first radio resource set, and also indicates a mode of multiplexing between the multiple different spatial domain filters.

In one embodiment, the first parameter indicates that the first-type information can be received by multiple different spatial receive parameters in the first radio resource set, and also indicates a mode of multiplexing between the multiple different spatial receive parameters.

In one embodiment, the first parameter indicates that the first-type information can be received by multiple different spatial domain filters in the first radio resource set, and also indicates a mode of multiplexing between the multiple different spatial domain filters.

In one embodiment, the mode of multiplexing is one of Time Division Multiplexing (TDM), Frequency Division Multiplexing (FDM) and Spatial Division Multiplexing (SDM).

Embodiment 9

Figure 9:
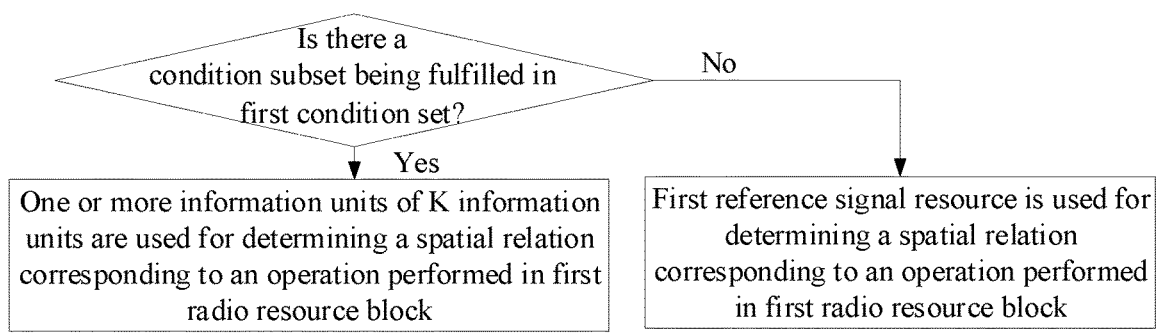
FIG. 9 illustrates a schematic diagram of a first condition set being used for determining whether a spatial relation corresponding to an operation performed in the first radio resource block is related to K information units according to one embodiment of the present disclosure.

Embodiment 9 illustrates a schematic diagram of a first condition set being used for determining whether a spatial relation corresponding to an operation performed in the first radio resource block is related to K information units according to one embodiment of the present disclosure; as shown in FIG. 9. In Embodiment 9, the first condition set comprises the M condition subsets; if one condition subset in the first condition set is fulfilled, one or more information units of the K information units are used for determining the spatial relation corresponding to the operation performed in the first radio resource block; or if none of condition subsets in the first condition set is fulfilled, the first reference signal resource is used for determining the spatial relation corresponding to the operation performed in the first radio resource block.

In one embodiment, the operating is monitoring, when one condition subset in the first condition set is fulfilled, one or more information units of the K information units are used by the first node for determining the spatial relation corresponding to the monitoring performed in the first radio resource block; when none of condition subsets in the first condition set is fulfilled, the first reference signal resource is used by the first node for determining the spatial relation corresponding to the monitoring performed in the first radio resource block.

In one embodiment, the operating is transmitting, when one condition subset in the first condition set is fulfilled, one or more information units of the K information units are used by the first node for determining the spatial relation corresponding to the transmitting performed in the first radio resource block; when none of condition subsets in the first condition set is fulfilled, the first reference signal resource is used by the first node for determining the spatial relation corresponding to the transmitting performed in the first radio resource block.

In one embodiment, the first condition set is composed of the M condition subsets.

In one embodiment, if a condition subset in the first condition set is fulfilled, one of the K information units is used for determining the spatial relation corresponding to the operation performed in the first radio resource block.

In one embodiment, if a condition subset in the first condition set is fulfilled, one and only one information unit of the K information units is used for determining the spatial relation corresponding to the operation performed in the first radio resource block.

In one embodiment, if a condition subset in the first condition set is fulfilled, multiple information units out of the K information units are used for determining the spatial relation corresponding to the operation performed in the first radio resource block.

In one embodiment, if a condition subset in the first condition set is fulfilled, two of the K information units are used for determining the spatial relation corresponding to the operation performed in the first radio resource block.

In one embodiment, if a condition subset in the first condition set is fulfilled, the first parameter is used for determining how many information units there are among the K information units being used for determining the spatial relation corresponding to the operation performed in the first radio resource block.

In one subembodiment, if the first parameter is not configured, only one information unit out of the K information units is used for determining the spatial relation corresponding to the operation performed in the first radio resource block.

In one subembodiment, if the first parameter is configured, multiple information units among the K information units are used for determining the spatial relation corresponding to the operation performed in the first radio resource block.

In one subembodiment, the first parameter indicates how many information units there are among the K information units being used for determining the spatial relation corresponding to the operation performed in the first radio resource block.

In one embodiment, if one of the M condition subsets is fulfilled, the spatial relation corresponding to the operation performed in the first radio resource block is related to the K information units; if none of the M condition subsets is fulfilled, the spatial relation corresponding to the operation performed in the first radio resource block is unrelated to any of the K information units.

In one embodiment, if a condition subset in the first condition set is fulfilled, the spatial relation corresponding to the operation performed in the first radio resource block is the spatial relation indicated by one or more information units of the K information units.

In one embodiment, any of the M condition subsets comprises a positive integer number of condition(s).

In one embodiment, for any given condition subset of the M condition subsets, when each condition contained in the given condition subset is fulfilled, the given condition subset is fulfilled; when one condition contained in the given condition subset is unfulfilled, the given condition subset is not fulfilled.

In one embodiment, for any given condition subset of the M condition subsets, if each condition contained in the given condition subset is fulfilled, the given condition subset is fulfilled; if there is one condition contained in the given condition subset not being fulfilled, the given condition subset is unfulfilled.

In one embodiment, of the M condition subsets there shan't be two condition subsets being fulfilled simultaneously.

In one embodiment, of the M condition subsets there shall be two condition subsets being fulfilled simultaneously.

In one embodiment, the first reference signal resource is unrelated to a reference signal resource indicated by the K information units.

In one embodiment, the first reference signal resource is unrelated to the first information block.

In one embodiment, the first reference signal resource is a default reference signal resource.

In one embodiment, the first reference signal resource is in no need of indication.

In one embodiment, the first reference signal resource is in no need of indication by an RRC signaling.

In one embodiment, the first reference signal resource is in no need of indication by a MAC CE signaling.

In one embodiment, the first reference signal resource is autonomously determined by the first node.

In one embodiment, the first reference signal resource is in no need of indication by a maintenance base station for a serving cell in which the first node is located.

In one embodiment, the first reference signal resource comprises a Synchronisation Signal/physical broadcast channel Block (SSB).

In one embodiment, the first reference signal resource comprises a CSI-RS resource.

In one embodiment, the first reference signal resource comprises an SSB determined in a random access process.

In one embodiment, the first reference signal resource comprises a CSI-RS resource determined in a random access process.

In one embodiment, the first reference signal resource comprises an SSB determined in an initial access process.

In one embodiment, the first reference signal resource comprises a CSI-RS resource determined in an initial access process.

In one embodiment, the first reference signal resource comprises an SSB determined in a latest random access process.

In one embodiment, the first reference signal resource comprises a CSI-RS resource determined in a latest random access process.

In one embodiment, the latest random access process is not started by a PDCCH that triggers a contention-free random access process.

In one embodiment, a PUSCH scheduled by a Random Access Response (RAR) Uplink Grant is used for determining the first reference signal resource.

In one embodiment, the first reference signal resource is used for determining a spatial domain filter of a PUSCH scheduled by RAR Uplink Grant.

In one embodiment, the first node receives or transmits a reference signal in the first reference signal resource and transmits a PUSCH scheduled by RAR Uplink Grant using a same spatial domain filter.

In one embodiment, a CORESET with a smallest ID configured to a downlink BandWidth Part (BWP) activated on a Primary Cell (PCell) is used for determining the first reference signal resource.

In one embodiment, the first reference signal resource is used for determining spatial setting of the CORESET with a smallest ID.

In one embodiment, the first node employs a same spatial domain filter to receive or transmit a reference signal in the first reference signal resource and to monitor a PDCCH in the CORESET with a smallest ID.

Embodiment 10

Embodiment 10 illustrates a schematic diagram of a first condition subset according to one embodiment of the present disclosure; as shown in FIG. 10. In Embodiment 10, the first condition subset includes the first parameter not being configured and receiving the second-type signaling in the first time window.

In one embodiment, if the first condition subset is fulfilled, one of the K information units is used for determining the spatial relation corresponding to the operation performed in the first radio resource block.

In one embodiment, if the first condition subset is fulfilled, one and only one information unit of the K information units is used for determining the spatial relation corresponding to the operation performed in the first radio resource block.

In one embodiment, if the first condition subset is fulfilled, a first information unit is used for determining the spatial relation corresponding to the operation performed in the first radio resource block, and the first information unit is an information unit activated by a second-type signaling last received in the first time window among all the K information units.

In one embodiment, the second-type signaling is used by the second node for activating one of the K information units.

In one embodiment, the second-type signaling is a MAC CE signaling.

In one embodiment, the second-type signaling comprises all or part of fields of a MAC CE.

In one embodiment, the second-type signaling is an RRC signaling.

In one embodiment, the second-type signaling comprises a MAC CE used for Physical Shared Channel TCI state activation/deactivation.

In one embodiment, the second-type signaling comprises all or part of fields of a MAC CE used for Physical Shared Channel TCI state activation/deactivation.

In one embodiment, the Physical Shared Channel includes a PDSCH.

In one embodiment, the Physical Shared Channel includes a PUSCH.

In one embodiment, the second-type signaling comprises a MAC CE used for PUCCH spatial relation activation/deactivation.

In one embodiment, the second-type signaling comprises all or part of fields of a MAC CE used for PUCCH spatial relation activation/deactivation.

In one embodiment, the second-type signaling comprises a MAC CE used for PDCCH TCI state indication.

In one embodiment, the second-type signaling comprises all or part of fields of a MAC CE used for PDCCH TCI state indication.

In one embodiment, the second-type signaling is transmitted on a PDSCH.

In one embodiment, the second-type signaling is used for activating one and only one information unit of the K information units.

In one embodiment, the phrase that the first parameter is not configured means that the first node is not configured with the first parameter.

In one embodiment, the phrase that the first parameter is not configured means that the first node is not configured with the first parameter by a maintenance base station for a serving cell in which the first node is located.

In one embodiment, if the first parameter is not configured, the second-type signaling is used for activating one and only one information unit of the K information units.

In one embodiment, if the first radio resource set corresponds to only one spatial relation, the second-type signaling is used for activating one and only one information unit of the K information units.

In one embodiment, the second-type signaling is used for activating multiple information units out of the K information units.

In one embodiment, if the first parameter is configured, the second-type signaling is used for activating multiple information units out of the K information units.

In one embodiment, if the first parameter is configured, the second-type signaling is used for activating one or more information units out of the K information units.

In one embodiment, if the first radio resource set corresponds to multiple spatial relations, the second-type signaling is used for activating multiple information units out of the K information units.

In one embodiment, if the first radio resource set corresponds to multiple spatial relations, the second-type signaling is used for activating one or more information units out of the K information units.

In one embodiment, the first radio resource block is used by the first node for determining the first time window.

In one embodiment, the first time window is a consecutive duration.

In one embodiment, the first time window comprises a positive integer number of multicarrier symbol(s).

In one embodiment, the first time window comprises a positive integer number of consecutive multicarrier symbols.

In one embodiment, the first time window comprises a positive integer number of slot(s).

In one embodiment, the first time window comprises a positive integer number of consecutive slots.

In one embodiment, an end of the first time window is no later than a start of a time unit to which an earliest multicarrier symbol comprised in the first radio resource block belongs in time domain.

In one embodiment, the time unit is a consecutive duration.

In one embodiment, the time unit comprises a positive integer number of consecutive multicarrier symbols.

In one embodiment, the time unit is a slot.

In one embodiment, the time unit is a sub-slot.

In one embodiment, a time interval between an end of the first time window and a start of a time unit to which an earliest multicarrier symbol comprised in the first radio resource block belongs is a first time interval.

In one subembodiment, the first time interval is a non-negative real number.

In one subembodiment, the first time interval is measured by slots.

In one subembodiment, the first time interval is measured by sub-slots.

In one subembodiment, the first time interval is measured by a positive integer number of multicarrier symbol(s).

In one subembodiment, the first time interval is measured by ms.

In one subembodiment, the first time interval is equal to 0.

In one subembodiment, the first time interval is greater than 0.

In one subembodiment, the first time interval is fixed.

In one subembodiment, the first time interval is pre-configured.

In one subembodiment, the first time interval is configured by an RRC signaling.

In one subembodiment, the first time interval is 2 slots.

In one subembodiment, a start of the first time window is no earlier than an end of a time unit to which a last multicarrier symbol used for transmitting the first information block belongs.

In one embodiment, a time interval between a start of the first time window and an end of a time unit to which a last multicarrier symbol used for transmitting the first information block belongs is a second time interval.

In one subembodiment, the second time interval is a non-negative real number.

In one subembodiment, the second time interval is measured by slots.

In one subembodiment, the second time interval is measured by a positive integer number of multicarrier symbol(s).

In one subembodiment, the second time interval is measured by ms.

In one subembodiment, the second time interval is equal to 0.

In one subembodiment, the second time interval is greater than 0.

In one subembodiment, the second time interval is fixed.

In one subembodiment, the second time interval is configured by an RRC signaling.

Embodiment 11

Embodiment 11 illustrates a schematic diagram of a second condition subset according to one embodiment of the present disclosure; as shown in FIG. 11. In Embodiment 11, the second condition subset includes the first parameter being configured and K being no greater than P.

In one embodiment, the phrase that the first parameter is configured means that the first node is configured with the first parameter.

In one embodiment, the phrase that the first parameter is configured means that the first node is configured with the first parameter by a maintenance base station for a serving cell in which the first node is located.

In one embodiment, P is a positive integer greater than 1.

In one embodiment, P is equal to 2.

In one embodiment, P is equal to 1.

In one embodiment, if the second condition subset is fulfilled, each information unit among the K information units is used for determining the spatial relation corresponding to the operation performed in the first radio resource block.

In one embodiment, if the second condition subset is fulfilled, only some of the K information units are used for determining the spatial relation corresponding to the operation performed in the first radio resource block.

In one embodiment, the second condition subset does not include receiving the second-type signaling in the first time window.

Embodiment 12

Embodiment 12 illustrates a schematic diagram of a third condition subset according to one embodiment of the present disclosure; as shown in FIG. 12. In Embodiment 12, the third condition subset includes the first parameter being configured, K being greater than P and receiving the second-type signaling in the first time window. If the third condition subset is fulfilled, each information unit in a first information unit subset is used for determining the spatial relation corresponding to the operation performed in the first radio resource block; the first information unit subset is composed of a positive integer number of information unit(s) of the K information units, and the second-type signaling received in the first time window is used for triggering each information unit in the first information unit subset.

In one embodiment, the number of information units comprised in the first information unit subset is no greater than the P.

In one embodiment, the number of information units comprised in the first information unit subset is equal to the P.

In one embodiment, the number of information units comprised in the first information unit subset is equal to 1.

In one embodiment, the number of information units comprised in the first information unit subset is equal to 2.

In one embodiment, the first information unit subset comprises P1 information units, P1 being a positive integer greater than 1.

In one subembodiment, the P1 information units are activated by the same second-type signaling.

In one subembodiment, the P1 information units are activated by different second-type signalings.

In one subembodiment, the P1 information units are activated by P1 different second-type signalings.

Embodiment 13

Figure 13:
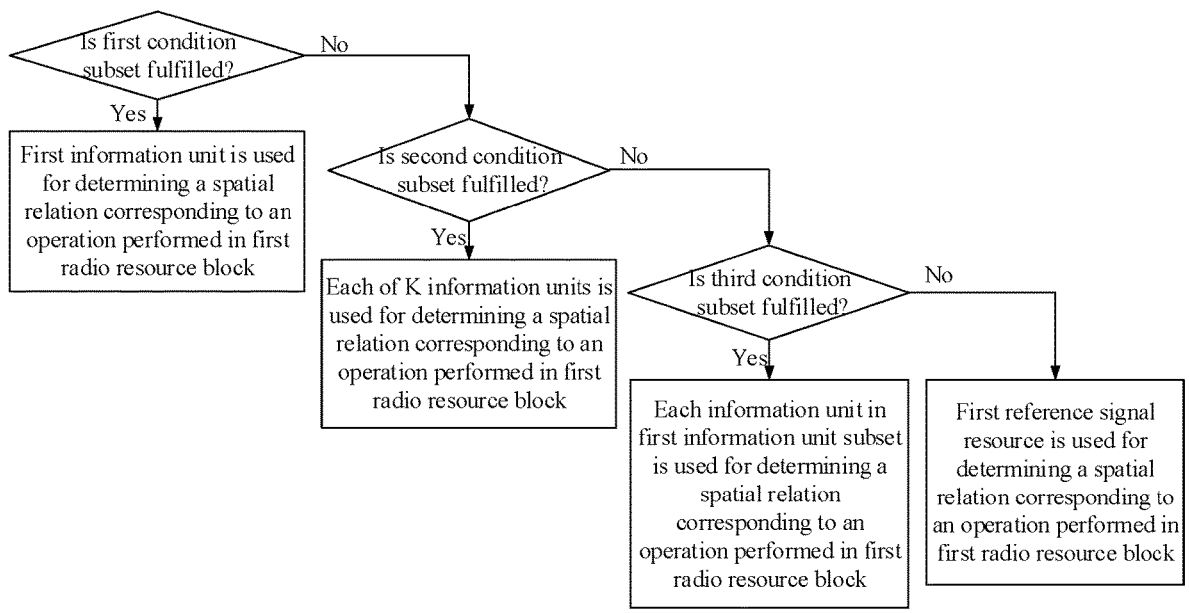
FIG. 13 illustrates a schematic diagram of a first condition set being used for determining whether a spatial relation corresponding to an operation performed in the first radio resource block is related to K information units according to one embodiment of the present disclosure.

Embodiment 13 illustrates a schematic diagram of a first condition set being used for determining whether a spatial relation corresponding to an operation performed in the first radio resource block is related to K information units according to one embodiment of the present disclosure; as shown in FIG. 13. In Embodiment 13, the first condition set comprises the first condition subset, the second condition subset and the third condition subset. If the first condition subset is fulfilled, the first information unit is used for determining the spatial relation corresponding to the operation performed in the first radio resource block; if the second condition subset is fulfilled, each of the K information units is used for determining the spatial relation corresponding to the operation performed in the first radio resource block; if the third condition subset is fulfilled, each information unit in the first information unit subset is used for determining the spatial relation corresponding to the operation performed in the first radio resource block; if none of the first condition subset, the second condition subset and the third condition subset is fulfilled, the first reference signal resource is used for determining the spatial relation corresponding to the operation performed in the first radio resource block.

In one embodiment, whether essential conditions for ensuring that one or more information units of the K information units are used for determining the spatial relation corresponding to the operation performed in the first radio resource block include receiving the second-type signaling in the first time window is related to the first parameter.

In one embodiment, whether essential conditions for ensuring that one or more information units of the K information units are used for determining the spatial relation corresponding to the operation performed in the first radio resource block include receiving the second-type signaling in the first time window is related to whether the first parameter is configured.

In one embodiment, whether essential conditions for ensuring that one or more information units of the K information units are used for determining the spatial relation corresponding to the operation performed in the first radio resource block include receiving the second-type signaling in the first time window is related to relative sizes of the K and the P.

In one embodiment, if either the second condition subset or the third condition subset is fulfilled, one of the K information units is used for determining the spatial relation corresponding to the operation performed in the first radio resource block.

In one embodiment, if either the second condition subset or the third condition subset is fulfilled, multiple information units among the K information units is used for determining the spatial relation corresponding to the operation performed in the first radio resource block.

In one embodiment, among the first condition subset, the second condition subset and the third condition subset, there aren't any two condition subsets being fulfilled simultaneously.

Embodiment 14

Figure 14:
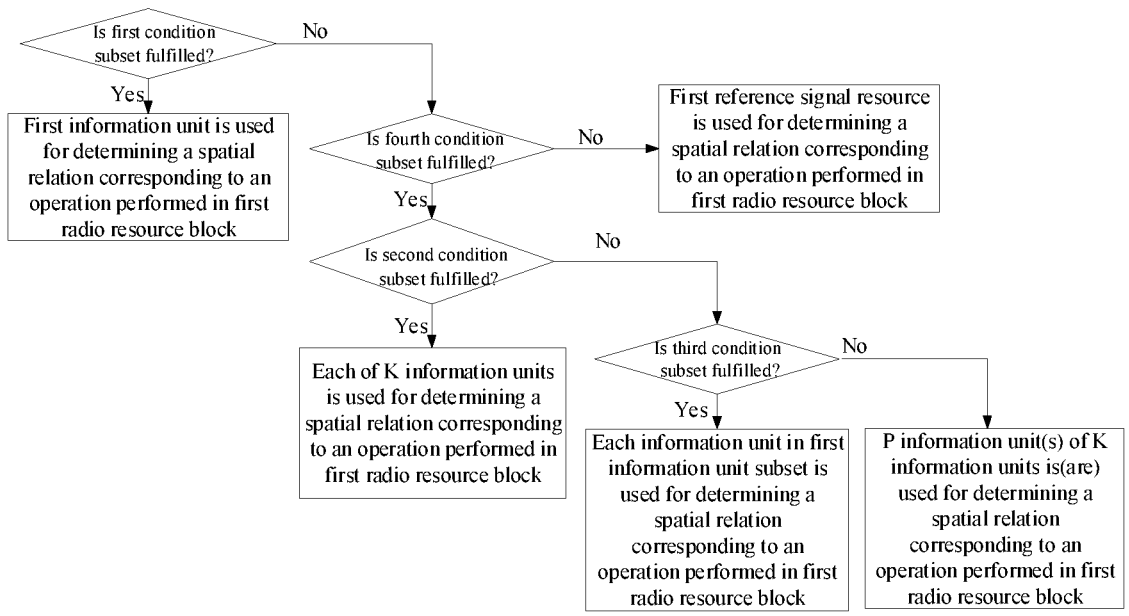
FIG. 14 illustrates a schematic diagram of a first condition set being used for determining whether a spatial relation corresponding to an operation performed in the first radio resource block is related to K information units according to one embodiment of the present disclosure.

Embodiment 14 illustrates a schematic diagram of a first condition set being used for determining whether a spatial relation corresponding to an operation performed in the first radio resource block is related to K information units according to one embodiment of the present disclosure; as shown in FIG. 14. In FIG. 14, the first condition set comprises a fourth condition subset, the fourth condition subset comprising that the first parameter is configured. If the fourth condition subset is fulfilled but neither of the second condition subset and the third condition subset is fulfilled, P information unit(s) of the K information units is(are) used for determining the spatial relation corresponding to the operation performed in the first radio resource block; if neither of the fourth condition subset and the first condition subset is fulfilled, the first reference signal resource is used for determining the spatial relation corresponding to the operation performed in the first radio resource block.

In one embodiment, the fourth condition subset only includes the first parameter being configured.

In one embodiment, each of the P information unit(s) has a default position in the K information units.

In one embodiment, the P information unit(s) is(are) P information unit(s) corresponding to the smallest first-type index among the K information units.

In one embodiment, the K information units are arranged in sequence in the first information block and the P information unit(s) is(are) P information index(es) ranking at the front among the K information units.

Embodiment 15

Figure 15:
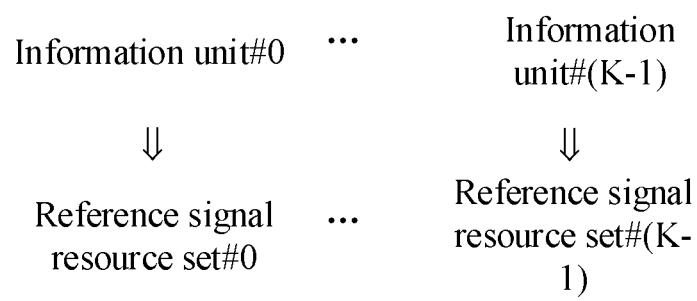
FIG. 15 illustrates a schematic diagram of K information units respectively indicating K reference signal resource sets according to one embodiment of the present disclosure.

Embodiment 15 illustrates a schematic diagram of K information units respectively indicating K reference signal resource sets according to one embodiment of the present disclosure; as shown in FIG. 15. In Embodiment 15, the phrase that a given information unit is used for determining the spatial relation corresponding to the operation performed in the first radio resource block means that a reference signal resource in a reference signal resource set indicated by the given information unit is used for determining the spatial relation corresponding to the operation performed in the first radio resource block; the given information unit is one of the K information units. In FIG. 15, indexes by which the K information units respectively indicate K reference signal resource sets are #0, . . . and #(K−1), respectively.

In one embodiment, each reference signal resource in a reference signal resource set indicated by the given information unit is used by the first node for determining the spatial relation corresponding to the operation performed in the first radio resource block.

In one embodiment, only one reference signal resource in a reference signal resource set indicated by the given information unit is used by the first node for determining the spatial relation corresponding to the operation performed in the first radio resource block.

In one subembodiment, the given information unit indicates a QCL type corresponding to each reference signal resource in a corresponding reference signal resource set; in the reference signal resource set indicated by the given information unit, only a reference signal resource of which a corresponding QCL type is a first QCL type is used for determining the spatial relation corresponding to the operation performed in the first radio resource block.

In one embodiment, the given information unit is any information unit related to the spatial relation corresponding to the operation performed in the first radio resource block among the K information units.

In one embodiment, any of the K information units indicates an identifier of each reference signal resource in a corresponding reference signal resource set.

In one embodiment, the identifier of a reference signal resource in the K reference signal resource sets includes one or more of SRS-ResourceSetId, SRS-ResourceId, NZP-CSI-RS-ResourceId, NZP-CSI-RS-ResourceSetId or SSB-Index.

In one embodiment, any of the K reference signal resource sets comprises a positive integer number of reference signal resource(s).

In one embodiment, there is one reference signal resource set among the K reference signal resource sets that only comprises one reference signal resource.

In one embodiment, there is one reference signal resource set among the K reference signal resource sets that comprises multiple reference signal resources.

In one embodiment, the K reference signal resource sets comprise a Sounding Reference Signal (SRS) resource set.

In one embodiment, the K reference signal resource sets comprise an SRS resource.

In one embodiment, the K reference signal resource sets comprise a CSI-RS resource.

In one embodiment, the K reference signal resource sets comprise a CSI-RS resource set.

In one embodiment, the K reference signal resource sets comprise an SSB resource.

In one embodiment, the type of reference signal resources in the K reference signal resource sets includes one or more of SRS resource, SRS resource set, CSI-RS resource or SSB resource.

In one embodiment, any reference signal resource in the K reference signal resource sets is one of an SRS resource, an SRS resource set, a CSI-RS resource or an SSB resource.

Embodiment 16

Embodiment 16 illustrates a schematic diagram of a given reference signal resource being used for determining a spatial relation corresponding to an operation performed in a given radio resource block according to one embodiment of the present disclosure; as shown in FIG. 16. In Embodiment 16, the given reference signal resource is a reference signal resource in the K reference signal resource sets, or is the first reference signal resource; the given reference signal resource is reserved for a given reference signal; the given radio resource block is the first radio resource block or any of the K1 resource sub-blocks.

In one embodiment, the given reference signal resource is a reference signal resource in the K reference signal resource sets.

In one embodiment, the given reference signal resource is any reference signal resource in the K reference signal resource sets.

In one embodiment, the given reference signal resource is the first reference signal resource.

In one embodiment, the given radio resource block is the first radio resource block.

In one embodiment, the given radio resource block is any of the K1 resource sub-blocks.

In one embodiment, a given information unit is used for determining the spatial relation corresponding to the operation performed in the given radio resource block, and the given resource signal resource is a reference signal resource in one of the K reference signal resource sets that corresponds to the given information unit.

In one embodiment, the phrase that the given reference signal resource is used for determining the spatial relation corresponding to the operation performed in the given radio resource block means that large-scale properties of a channel that the given reference signal goes through can be used to infer large-scale properties of a channel that a radio signal carrying the first-type information transmitted in the given radio resource block goes through.

In one embodiment, the large-scale properties include one or more of delay spread, Doppler spread, Doppler shift, average delay or Spatial Rx parameter.

In one embodiment, the phrase that the given reference signal resource is used for determining the spatial relation corresponding to the operation performed in the given radio resource block means that a spatial domain filter corresponding to the given reference signal is used for determining the spatial domain filter corresponding to the operation performed in the given radio resource block.

In one embodiment, the phrase that the given reference signal resource is used for determining the spatial relation corresponding to the operation performed in the given radio resource block means that the first node receives the given reference signal and transmits the first-type information in the given radio resource block employing a same spatial-domain filter; the operating is transmitting.

In one embodiment, the phrase that the given reference signal resource is used for determining the spatial relation corresponding to the operation performed in the given radio resource block means that the first node receives the given reference signal and monitors the first-type information in the given radio resource block employing a same spatial-domain filter; the operating is monitoring.

In one embodiment, the phrase that the given reference signal resource is used for determining the spatial relation corresponding to the operation performed in the given radio resource block means that the first node transmits the given reference signal and transmits the first-type information in the given radio resource block employing a same spatial-domain filter; the operating is transmitting.

In one embodiment, the phrase that the given reference signal resource is used for determining the spatial relation corresponding to the operation performed in the given radio resource block means that the first node transmits the given reference signal and monitors the first-type information in the given radio resource block employing a same spatial-domain filter; the operating is monitoring.

In one embodiment, the phrase that the given reference signal resource is used for determining the spatial relation corresponding to the operation performed in the given radio resource block means that a DMRS antenna port corresponding to the first-type information transmitted in the given radio resource block is QCL with the given reference signal.

Embodiment 17

Embodiment 17 illustrates a schematic diagram of a second information block according to one embodiment of the present disclosure; as shown in FIG. 17. In Embodiment 17, the second information block is used for configuring the first parameter.

In one embodiment, the second information block is used by the second node for configuring the first parameter.

In one embodiment, the second information block is used for configuring the first parameter for the first node.

In one embodiment, the second information block is carried by a higher layer signaling.

In one embodiment, the second information block is carried by an RRC signaling.

In one embodiment, the second information block is carried by a MAC CE signaling.

In one embodiment, the second information block is transmitted in Downlink.

In one embodiment, the second information block is transmitted in SideLink.

In one embodiment, the second information block comprises a positive integer number of information bit(s).

In one embodiment, the second information block indicates the first parameter.

In one embodiment, the second information block and the first information block are carried by a same RRC signaling.

In one embodiment, the second information block and the first information block are carried by different RRC signalings.

In one embodiment, the second information block comprises information in all or part of fields of an IE.

In one embodiment, the second information block comprises information in all or part of fields of a ControlResourceSet IE.

In one embodiment, the second information block comprises information in all or part of fields of a SearchSpace IE.

In one embodiment, the second information block comprises information in all or part of fields of a PDCCH-Config IE.

In one embodiment, the second information block and the first information block respectively comprise information of different fields of an IE.

In one embodiment, the second information block and the first information block are transmitted in a same time-domain resource.

In one embodiment, a time-domain resource occupied by the second information block is earlier than a time-domain resource occupied by the first information block.

In one embodiment, a time-domain resource occupied by the second information block is later than a time-domain resource occupied by the first information block.

Embodiment 18

Embodiment 18 illustrates a schematic diagram of relations among K1 information units and K1 resource sub-blocks according to one embodiment of the present disclosure; as shown in FIG. 18. In Embodiment 18, if the K1 information units of the K information units are used for determining the spatial relation corresponding to the operation performed in the first radio resource block and K1 is a positive integer greater than 1, the first radio resource block is divided into K1 resource sub-blocks, and the K1 information units are used for respectively determining the spatial relation corresponding to the operation performed in the K1 resource sub-blocks. In FIG. 18, indexes for the K1 information units and the K1 resource sub-blocks are #0, . . . and #(K1−1), respectively.

In one embodiment, the operating is monitoring; the K1 information units are respectively used for determining the spatial relations corresponding to the monitorings respectively performed in the K1 resource sub-blocks.

In one embodiment, the operating is transmitting; the K1 information units are respectively used for determining the spatial relations corresponding to the transmittings respectively performed in the K1 resource sub-blocks.

In one embodiment, the spatial relation corresponding to the operation performed in the K1 resource sub-blocks are respectively the spatial relations indicated by the K1 information units.

In one embodiment, the K1 information units respectively indicate K1 reference signal resource sets of the K reference signal resource sets, the phrase that the K1 information units are respectively used for determining the spatial relation corresponding to the operation performed in the K1 resource sub-blocks means that reference signal resources in the K1 reference signal resource sets are respectively used for determining the spatial relation corresponding to the operation performed in the K1 resource sub-blocks.

In one subembodiment, for a given resource sub-block of the K1 resource sub-blocks, one and only one reference signal resource in a corresponding reference signal resource set is used for determining the spatial relation corresponding to the operation performed in the given resource sub-block.

In one subembodiment, for a given resource sub-block of the K1 resource sub-blocks, each reference signal resource in a corresponding reference signal resource set is used for determining the spatial relation corresponding to the operation performed in the given resource sub-block.

In one embodiment, the K1 is a positive integer greater than 1 and no greater than the K.

In one embodiment, the K1 is equal to the K.

In one embodiment, the K1 is less than the K.

In one embodiment, the K1 is equal to 2.

In one embodiment, the first radio resource block is composed of the K1 resource sub-blocks.

In one embodiment, any two of the K1 resource sub-blocks occupy mutually orthogonal time-frequency resources.

In one embodiment, any two of the K1 resource sub-blocks occupy mutually orthogonal time-domain resources.

In one embodiment, any two of the K1 resource sub-blocks occupy mutually orthogonal frequency-domain resources.

In one embodiment, any two of the K1 resource sub-blocks occupy a same time-frequency resource and different DMRS ports.

In one embodiment, any two of the K1 resource sub-blocks occupy a same time-frequency resource and different DMRS CDM groups.

In one embodiment, the first-type information is repeatedly transmitted in the K1 resource sub-blocks.

Embodiment 19

Embodiment 19 illustrates a structure block diagram of a processing device in a first node according to one embodiment of the present disclosure; as shown in FIG. 19. In FIG. 19, a processing device 1900 in a first node comprises a first receiver 1901 and a first processor 1902.

In Embodiment 19, the first receiver 1901 receives a first information block; the first processor 1902 operates first-type information in a first radio resource block.

In Embodiment 19, the first information block is used for determining a first radio resource set and K information units, K being a positive integer greater than 1; the first radio resource block belongs to the first radio resource set; the K information units respectively indicate K spatial relations; a first condition set is used for determining whether a spatial relation corresponding to the operation performed in the first radio resource block is related to the K information units; the first condition set is related to a first parameter, and the first parameter is used for determining whether the first radio resource set corresponds to multiple spatial relations; the operating is monitoring, or the operating is transmitting.

In one embodiment, the first condition set comprises M condition subsets, M being a positive integer greater than 1; when one condition subset in the first condition set is fulfilled, one or more information units of the K information units are used for determining the spatial relation corresponding to the operation performed in the first radio resource block; when none of condition subsets in the first condition set is fulfilled, a first reference signal resource is used for determining the spatial relation corresponding to the operation performed in the first radio resource block, and the first reference signal resource is unrelated to the K information units.

In one embodiment, the first condition set comprises a first condition subset, the first condition subset comprising that the first parameter is not configured and that a second-type signaling is received in a first time window; the second-type signaling is used for activating one of the K information units; the first radio resource block is used for determining the first time window.

In one embodiment, the first condition set comprises a second condition subset and a third condition subset; the second condition subset comprises that the first parameter is configured and that K is no greater than P; the third condition subset comprises that the first parameter is configured, K is greater than P and that a second-type signaling is received in a first time window; the first parameter indicates that the first radio resource set corresponds to P spatial relation(s), P being a positive integer; the second-type signaling is used for activating one of the K information units; the first radio resource block is used for determining the first time window.

In one embodiment, the K information units respectively indicate K reference signal resource sets; the phrase that a given information unit is used for determining the spatial relation corresponding to the operation performed in the first radio resource block includes a meaning that: a reference signal resource in a reference signal resource set indicated by the given information unit is used for determining the spatial relation corresponding to the operation performed in the first radio resource block; the given information unit is one of the K information units.

In one embodiment, the first receiver 1901 receives a second information block; herein, the second information block is used for configuring the first parameter.

In one embodiment, when K1 information units of the K information units are used for determining the spatial relation corresponding to the operation performed in the first radio resource block and K1 is a positive integer greater than 1, the first radio resource block is divided into K1 resource sub-blocks, and the K1 information units are used for respectively determining the spatial relation corresponding to the operation performed in the K1 resource sub-blocks.

In one embodiment, the first node is a UE.

In one embodiment, the first node is a relay node.

In one embodiment, the first receiver 1901 comprises at least one of the antenna 452, the receiver 454, the receiving processor 456, the multi-antenna receiving processor 458, the controller/processor 459, the memory 460 or the data source 467 in Embodiment 4.

In one embodiment, the first processor 1902 comprises at least one of the antenna 452, the receiver/transmitter 454, the receiving processor 456, the transmitting processor 468, the multi-antenna receiving processor 458, the multi-antenna transmitting processor 457, the controller/processor 459, the memory 460 or the data source 467 in Embodiment 4.

Embodiment 20

Embodiment 20 illustrates a structure block diagram of a processing device in a second node according to one embodiment of the present disclosure; as shown in FIG. 20. In FIG. 20, a processing device 2000 in a second node comprises a first transmitter 2001 and a second processor 2002.

In Embodiment 20, the first transmitter 2001 transmits a first information block; the second processor 2002 processes first-type information in a first radio resource block.

In Embodiment 20, the first information block is used for determining a first radio resource set and K information units, K being a positive integer greater than 1; the first radio resource block belongs to the first radio resource set; the K information units respectively indicate K spatial relations; a first condition set is used for determining whether a spatial relation corresponding to an operation performed in the first radio resource block is related to the K information units; the first condition set is related to a first parameter, and the first parameter is used for determining whether the first radio resource set corresponds to multiple spatial relations; the processing is transmitting, or the processing is receiving; when the processing is transmitting, the operating is monitoring, a target receiver of the first-type information monitors the first-type information in the first radio resource block; when the processing is receiving, the operating is transmitting, a transmitter of the first-type information transmits the first-type information in the first radio resource block.

In one embodiment, the first condition set comprises M condition subsets, M being a positive integer greater than 1; when one condition subset in the first condition set is fulfilled, one or more information units of the K information units are used for determining the spatial relation corresponding to the operation performed in the first radio resource block; when none of condition subsets in the first condition set is fulfilled, a first reference signal resource is used for determining the spatial relation corresponding to the operation performed in the first radio resource block, and the first reference signal resource is unrelated to the K information units.

In one embodiment, the first condition set comprises a first condition subset, the first condition subset comprising that the first parameter is not configured and that a second-type signaling is received in a first time window; the second-type signaling is used for activating one of the K information units; the first radio resource block is used for determining the first time window.

In one embodiment, the first condition set comprises a second condition subset and a third condition subset; the second condition subset comprises that the first parameter is configured and that K is no greater than P; the third condition subset comprises that the first parameter is configured, K is greater than P and that a second-type signaling is received in a first time window; the first parameter indicates that the first radio resource set corresponds to P spatial relation(s), P being a positive integer; the second-type signaling is used for activating one of the K information units; the first radio resource block is used for determining the first time window.

In one embodiment, the K information units respectively indicate K reference signal resource sets; the phrase that a given information unit is used for determining the spatial relation corresponding to the operation performed in the first radio resource block includes a meaning that: a reference signal resource in a reference signal resource set indicated by the given information unit is used for determining the spatial relation corresponding to the operation performed in the first radio resource block; the given information unit is one of the K information units.

In one embodiment, the first transmitter 2001 transmits a second information block; herein, the second information block is used for configuring the first parameter.

In one embodiment, when K1 information units of the K information units are used for determining the spatial relation corresponding to the operation performed in the first radio resource block and K1 is a positive integer greater than 1, the first radio resource block is divided into K1 resource sub-blocks, and the K1 information units are used for respectively determining the spatial relation corresponding to the operation performed in the K1 resource sub-blocks.

In one embodiment, the second node is a base station.

In one embodiment, the second node is a UE.

In one embodiment, the second node is a relay node.

In one embodiment, the first transmitter 2001 comprises at least one of the antenna 420, the transmitter 418, the transmitting processor 416, the multi-antenna transmitting processor 471, the controller/processor 475 or the memory 476 in Embodiment 4.

In one embodiment, the second processor 2002 comprises at least one of the antenna 420, the receiver/transmitter 418, the receiving processor 470, the transmitting processor 416, the multi-antenna receiving processor 472, the multi-antenna transmitting processor 471, the controller/processor 475 or the memory 476 in Embodiment 4.

Embodiment 21

Embodiment 21 illustrates a flowchart of a first signaling and a first signal according to one embodiment of the present disclosure, as shown in FIG. 21. In 2100 illustrated by FIG. 21, each box represents a step. Particularly, the order of steps marked by each box does not necessarily represent the specific chronological relations among these steps.

In Embodiment 21, the first node in the present disclosure receives a first signaling in a first resource pool in step S2101; and receives a first signal in step S2102. Herein, the first signaling indicates scheduling information of the first signal; the first resource pool corresponds to a first spatial relation set; the first signaling does not comprise a first field, the first field indicating a spatial relation corresponding to a signal scheduled by a signaling to which the first field belongs; the first signal corresponds to a first spatial relation, and a number of spatial relations comprised in the first spatial relation set is used for determining the first spatial relation.

In one embodiment, the first resource pool comprises a time-domain resource.

In one embodiment, the first resource pool comprises a frequency-domain resource.

In one embodiment, the first resource pool comprises a code-domain resource.

In one embodiment, the code-domain resource comprises one or more of a port of DeModulation Reference Signals (DMRS), a DMRS CDM group, a pseudo-random sequence, a Zadoff-Chu sequence, a low Peak-to-Average Power Ratio (PAPR) sequence, a cyclic shift, an Orthogonal Cover Code (OCC) or an orthogonal sequence.

In one embodiment, the first resource pool occupies a positive integer number of RE(s) in time-frequency domain.

In one embodiment, an RE occupies a multicarrier symbol in time domain and a subcarrier in frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the first resource pool occupies a positive integer number of subcarrier(s) in frequency domain.

In one embodiment, the first resource pool occupies a positive integer number of PRB(s) in frequency domain.

In one embodiment, the first resource pool occupies a positive integer number of multicarrier symbol(s) in time domain.

In one embodiment, the first resource pool occupies a positive integer number of slot(s) in time domain.

In one embodiment, the first resource pool occurs only once in time domain.

In one embodiment, the first resource pool occurs multiple times in time domain.

In one embodiment, the first resource pool occurs periodically in time domain.

In one embodiment, the first resource pool occurs aperiodically in time domain.

In one embodiment, the first resource pool comprises a CORESET.

In one embodiment, the first resource pool comprises a search space.

In one embodiment, the first resource pool comprises a search space set.

In one embodiment, the first resource pool comprises a positive integer number of PDCCH candidate(s).

In one embodiment, the first resource pool comprises multiple CCEs.

In one embodiment, the first resource pool comprises multiple REGs.

In one embodiment, the first signaling comprises a physical layer signaling.

In one embodiment, the first signaling comprises a dynamic signaling.

In one embodiment, the first signaling comprises an L1 signaling.

In one embodiment, the first signaling comprises an L1 control signaling.

In one embodiment, the first signaling comprises DCI.

In one embodiment, the first signaling comprises one or more fields of a piece of DCI.

In one embodiment, the first signaling comprises one or more fields of a piece of SCI.

In one embodiment, the first signaling comprises DCI used for DownLink Grant.

In one embodiment, the first signaling comprises DCI activated by Downlink Semi-Persistent Scheduling Assignment.

In one embodiment, the first signaling comprises an RRC signaling.

In one embodiment, the first signaling comprises a MAC CE signaling.

In one embodiment, a format of the first signaling includes DCI format 1_0.

In one embodiment, the format of the first signaling includes DCI format 1_1.

In one embodiment, the format of the first signaling includes DCI format 1_2.

In one embodiment, a higher layer parameter tci-PresentInDCI configured for the first node is not enabled.

In one embodiment, the first node is not configured with a higher layer parameter tci-PresentInDCI.

In one embodiment, a higher layer parameter tci-PresentInDCI-ForDCIFormat1_2 configured for the first node is not enabled.

In one embodiment, the first node is not configured with a higher layer parameter tci-PresentInDCI-ForDCIFormat1_2.

In one embodiment, the first signal comprises a baseband signal.

In one embodiment, the first signal comprises a radio signal.

In one embodiment, the first signal comprises an RF signal.

In one embodiment, the first signal carries a bit block, and the bit block is a Transport Block (TB), a Code Block (CB) or a Code Block Group (CBG).

In one embodiment, the scheduling information of the first signal comprises one or more of a time-domain resource occupied, a frequency-domain resource occupied, a Modulation and Coding Scheme (MCS), a DMRS port, a HARQ process number, a Redundancy Version (RV) or a New Data Indicator (NDI).

In one embodiment, the first signaling explicitly indicates the scheduling information of the first signal.

In one embodiment, the first signaling implicitly indicates the scheduling information of the first signal.

In one embodiment, the first signaling explicitly indicates part of the scheduling information of the first signal and implicitly indicates the other part of the scheduling information of the first signal.

In one embodiment, the first signal occurs only once in time domain.

In one embodiment, the first signal occurs multiple times in time domain.

In one embodiment, the first signal comprises a transmission of the first bit block.

In one embodiment, the first signal comprises multiple repetitions of transmission of the first bit block.

In one embodiment, the first spatial relation set comprises a positive integer number of spatial relation(s).

In one embodiment, the number of spatial relation(s) comprised by the first spatial relation set is equal to 1.

In one embodiment, the number of spatial relations comprised by the first spatial relation set is greater than 1.

In one embodiment, the number of spatial relations comprised by the first spatial relation set is equal to 2.

In one embodiment, the number of spatial relation(s) comprised by the first spatial relation set is equal to either 1 or 2.

In one embodiment, the spatial relation comprises a TCI state.

In one embodiment, the spatial relation comprises QCL assumption.

In one embodiment, the spatial relation comprises a QCL parameter.

In one embodiment, the spatial relation comprises a QCL relation.

In one embodiment, the spatial relation comprises spatial setting.

In one embodiment, the spatial relation comprises a Spatial Relation.

In one embodiment, the spatial relation comprises a spatial domain filter.

In one embodiment, the spatial relation comprises a spatial domain transmission filter.

In one embodiment, the spatial relation comprises a spatial domain receive filter.

In one embodiment, the spatial relation comprises a Spatial Tx parameter.

In one embodiment, the spatial relation comprises a Spatial Rx parameter.

In one embodiment, the spatial relation comprises large-scale properties.

In one embodiment, the large-scale properties include one or more of delay spread, Doppler spread, Doppler shift, average delay or Spatial Rx parameter.

In one embodiment, a correspondence relation between the first resource pool and the first spatial relation set is configured by an RRC signaling.

In one embodiment, a correspondence relation between the first resource pool and the first spatial relation set is configured by an IE.

In one embodiment, a correspondence relation between the first resource pool and the first spatial relation set is configured by an RRC signaling and a MAC CE together.

In one embodiment, the phrase that the first resource pool corresponds to a first spatial relation set means that the first resource pool corresponds to each spatial relation in the first spatial relation set.

In one embodiment, the phrase that the first resource pool corresponds to a first spatial relation set means that the first spatial relation set only comprises one spatial relation and the first resource pool corresponds to the spatial relation.

In one embodiment, the phrase that the first resource pool corresponds to a first spatial relation set means that the first spatial relation set only comprises one spatial relation and the first resource pool only corresponds to the spatial relation.

In one embodiment, the phrase that the first resource pool corresponds to a first spatial relation set means that the first spatial relation set comprises multiple spatial relations and the first resource pool corresponds to each of the multiple spatial relations.

In one embodiment, the phrase that the first resource pool corresponds to a first spatial relation set means that the first spatial relation set comprises multiple spatial relations and the first resource pool corresponds to multiple activated spatial relations simultaneously.

In one embodiment, each spatial relation in the first spatial relation set is an activated spatial relation corresponding to the first resource pool.

In one embodiment, any spatial relation in the first spatial relation set indicates a reference signal resource.

In one subembodiment, a QCL type corresponding to the reference signal resource is QCL-TypeD.

In one subembodiment, the reference signal resource is one of a CSI-RS resource, an SSB resource or an SRS resource.

In one embodiment, when there is a spatial relation in the first spatial relation set indicating two reference signal resources, and the two reference signal resources respectively correspond to two different QCL types.

In one subembodiment, the two different QCL types are QCL-TypeD and QCL-TypeA, respectively.

In one embodiment, the first field comprises all or part of information in a Transmission configuration indication field.

In one embodiment, the first field is a Transmission configuration indication field.

In one embodiment, the first field indicates a TCI state.

In one embodiment, the first field indicates one or two TCI states.

In one embodiment, the first field indicates a TCI codepoint.

In one embodiment, the first signaling that the first field belongs to comprises an L1 signaling.

In one embodiment, the first signaling that the first field belongs to comprises one or more fields in a piece of DCI.

In one embodiment, the first signaling that the first field belongs to comprises DCI used for Downlink Grant.

In one embodiment, a signal scheduled by the first signaling that the first field belongs to includes a baseband signal.

In one embodiment, a signal scheduled by the first signaling that the first field belongs to includes a radio signal.

In one embodiment, a signal scheduled by the first signaling that the first field belongs to is transmitted on a PDSCH.

In one embodiment, a signal scheduled by the first signaling that the first field belongs to corresponds to a transmission channel being a DownLink Shared Channel (DL-SCH).

In one embodiment, the first field indicates a TCI state corresponding to a signal scheduled by the first signaling that the first field belongs to.

Embodiment 22

Figure 22:
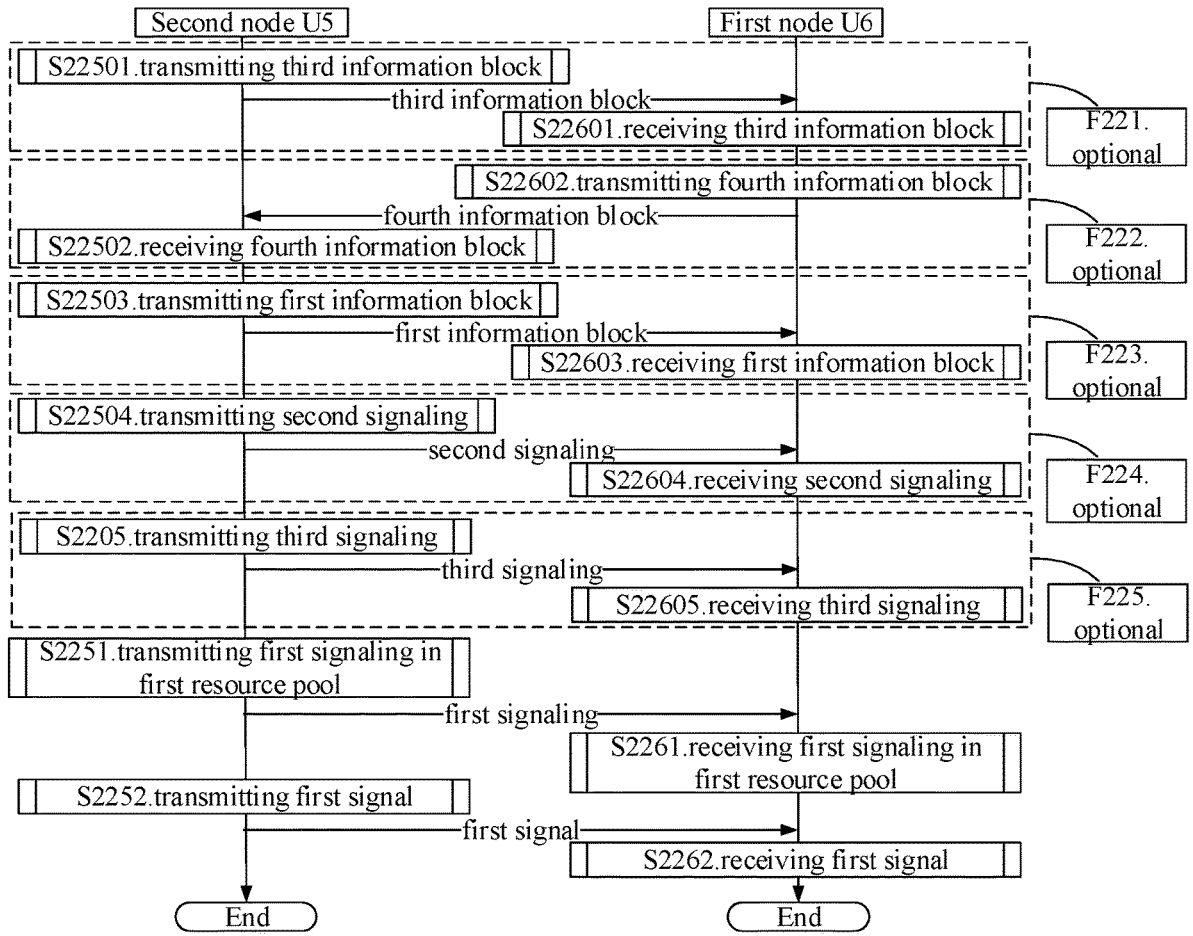
FIG. 22 illustrates a flowchart of wireless transmission according to one embodiment of the present disclosure.

Embodiment 22 illustrates a flowchart of wireless transmission according to one embodiment of the present disclosure, as shown in FIG. 22. In FIG. 22, a second node U5 and a first node U6 are communication nodes that transmit via an air interface. In FIG. 22, steps marked by boxes F221-F225 are optional, respectively.

The second node U5 transmits a third information block in step S22501; receives a fourth information block in step S22502; and transmits a first information block in step S22503; transmits a second signaling in step S22504; transmits a third signaling in step S22505; and transmits a first signaling in a first resource pool in step S2251; and transmits a first signal in step S2252.

The first node U6 receives a third information block in step S22601; transmits a fourth information block in step S22602; and receives a first information block in step S22603; receives a second signaling in step S22604; receives a third signaling in step S22605; and receives a first signaling in a first resource pool in step S2261; and receives a first signal in step S2262.

In Embodiment 22, the first signaling indicates scheduling information of the first signal; the first resource pool corresponds to a first spatial relation set; the first signaling does not comprise a first field, the first field indicating a spatial relation corresponding to a signal scheduled by a signaling to which the first field belongs; the first signal corresponds to a first spatial relation, and a number of spatial relations comprised in the first spatial relation set is used by the first node U6 for determining the first spatial relation.

In one embodiment, the first node U6 is the first node in the present disclosure.

In one embodiment, the second node U5 is the second node in the present disclosure.

In one embodiment, an air interface between the second node U5 and the first node U6 comprises a wireless interface between a base station and a UE.

In one embodiment, an air interface between the second node U5 and the first node U6 comprises a wireless interface between UEs.

In one embodiment, the first signaling is transmitted on a downlink physical layer control channel (i.e., a downlink channel only capable of carrying a physical layer signaling).

In one embodiment, the first signaling is transmitted on a PDCCH.

In one embodiment, the first signaling is transmitted on a Physical Sidelink Control Channel (PSCCH).

In one embodiment, the first signal is transmitted on a downlink physical layer data channel (i.e., a downlink channel capable of carrying physical layer data).

In one embodiment, the first signal is transmitted on a PDSCH.

In one embodiment, the first signal is transmitted on a PSSCH.

In one embodiment, steps marked by the box F221 in FIG. 22 exist; a time interval between the first signaling and the first signal is no smaller than a first threshold, the third information block indicating the first threshold.

In one embodiment, the third information block is carried by an RRC signaling.

In one embodiment, steps marked by the box F221 in FIG. 22 don't exist.

In one embodiment, steps marked by the box F222 in FIG. 22 exist; a time interval between the first signaling and the first signal is no smaller than a first threshold, the fourth information block being used by the second node U1 for determining the first threshold.

In one embodiment, the fourth information block indicates the first threshold.

In one embodiment, the fourth information block is carried by an RRC signaling.

In one embodiment, the fourth information block comprises all or part of information in a timeDurationForQCL field of a FeatureSetDownlink IE.

In one embodiment, steps marked by the box F222 in FIG. 22 don't exist.

In one embodiment, steps marked by the box F223 in FIG. 22 exist; the first signal corresponds to each spatial relation in a second spatial relation set, the first spatial relation belongs to the second spatial relation set, and the first information block is used by the first node for determining the number of spatial relations comprised in the second spatial relation set.

In one embodiment, steps marked by the box F223 in FIG. 22 don't exist.

In one embodiment, steps marked by the box F224 in FIG. 22 exist; the second signaling indicates configuration information of the first resource pool.

In one embodiment, the second signaling is an RRC signaling.

In one embodiment, the second signaling is a MAC CE signaling.

In one embodiment, the second signaling comprises information in all or part of fields of a ControlResourceSet IE.

In one embodiment, the configuration information comprises one or more of a time-domain resource occupied, a frequency-domain resource occupied, a code-domain resource occupied, a DMRS scrambling sequence, type of mapping from CCE to REG, CCE aggregation level, a number of PDCCH candidates, a SearchSpace Type or a PDCCH format.

In one embodiment, the second signaling indicates the first spatial relation set.

In one embodiment, the second signaling indicates P candidate spatial relations, P being a positive integer greater than 1; any spatial relation in the first spatial relation set is one of the P candidate spatial relations.

In one embodiment, steps marked by the box F55 in FIG. 22 exist; the third signaling activates each spatial relation comprised by the first spatial relation set from the P candidate spatial relations.

In one embodiment, the third signaling is a MAC CE signaling.

In one embodiment, the third signaling is a physical layer signaling.

In one embodiment, each of the steps marked by the boxes F224 and F225 in FIG. 22 exist.

In one embodiment, steps marked by the box F224 exist while steps marked by the box F225 do not exist in FIG. 22.

Embodiment 23

Figure 23:
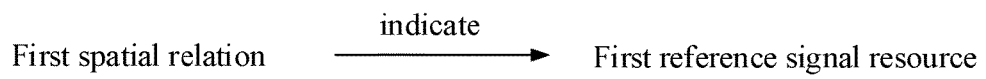
FIG. 23 illustrates a schematic diagram of a first spatial relation according to one embodiment of the present disclosure.

Embodiment 23 illustrates a schematic diagram of a first spatial relation according to one embodiment of the present disclosure; as shown in FIG. 23. In Embodiment 23, the first spatial relation indicates a first reference signal resource, the first reference signal resource is reserved for a first reference signal, and the first reference signal resource is used for determining a spatial relation of the first signal.

In one embodiment, the first spatial relation indicates a QCL type corresponding to the first reference signal resource.

In one embodiment, the QCL type corresponding to the first reference signal resource is QCL-TypeD.

In one embodiment, the first spatial relation indicates a second reference signal resource, and the second reference signal resource corresponds to a different QCL type from that corresponding to the first reference signal resource, and the second reference signal resource is used for determining the spatial relation of the first signal.

In one subembodiment, a QCL type corresponding to the second reference signal resource is QCL-TypeA.

In one embodiment, the first reference signal resource comprises a CSI-RS resource.

In one embodiment, the first reference signal resource comprises a CSI-RS resource set.

In one embodiment, the first reference signal resource comprises an SSB resource.

In one embodiment, the first reference signal resource comprises an SRS resource.

In one embodiment, the first reference signal resource comprises an SRS resource set.

In one embodiment, the first reference signal resource is periodic.

In one embodiment, the first reference signal resource is semi-persistent.

In one embodiment, the first reference signal resource is aperiodic.

In one embodiment, the first reference signal comprises a CSI-RS.

In one embodiment, the first reference signal comprises a None Zero-Power (NZP) CSI-RS.

In one embodiment, the first reference signal comprises an SSB.

In one embodiment, the first reference signal comprises an SRS.

Embodiment 24

Figure 24:
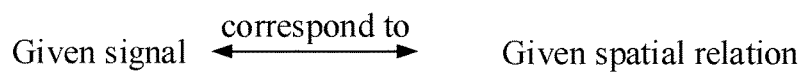
FIG. 24 illustrates a schematic diagram of a given signal corresponding to a given spatial relation according to one embodiment of the present disclosure.

Embodiment 24 illustrates a schematic diagram of a given signal corresponding to a given spatial relation according to one embodiment of the present disclosure; as shown in FIG. 24. In Embodiment 24, the given signal corresponds to the given spatial relation, the given spatial relation indicates a given reference signal resource, and the given reference signal resource is reserved for a given reference signal.

In one embodiment, the given signal is the first signal, and the given spatial relation is the first spatial relation.

In one embodiment, the given signal is the first signal, and the given spatial relation is any spatial relation comprised in the second spatial relation set.

In one embodiment, the given signal is any signal scheduled by a signaling to which the first field belongs.

In one embodiment, the second spatial relation set comprises Q spatial relations, Q being a positive integer greater than 1; the first signal comprises Q sub-signals, and spatial relations corresponding to the Q sub-signals are respectively the Q spatial relations; the given signal is any one of the Q sub-signals, and the given spatial relation is one of the Q spatial relations corresponding to the given signal.

In one embodiment, a QCL type corresponding to the given reference signal is QCL-TypeD.

In one embodiment, the given spatial relation indicates multiple reference signal resources, and the given reference signal is any of the multiple reference signal resources.

In one embodiment, the given spatial relation indicates multiple reference signal resources, and any two of the multiple reference signal resources correspond to different QCL types, and the given reference signal is a reference signal resource of which a corresponding QCL type is QCL-TypeD among the multiple reference signal resources.

In one embodiment, the phrase that the given signal corresponds to the given spatial relation means that large-scale properties of a channel that given reference signal goes through can be used to infer large-scale properties of a channel that the given signal goes through.

In one embodiment, the phrase that the given signal corresponds to the given spatial relation means that a spatial domain filter corresponding to the given reference signal is used for determining a spatial domain filter corresponding to the given signal.

In one embodiment, the phrase that the given signal corresponds to the given spatial relation means that the first node employs a same spatial domain filter to receive the given reference signal and the given signal.

In one embodiment, the phrase that the given signal corresponds to the given spatial relation means that the first node employs a same spatial domain filter to transmit the given reference signal and receive the given signal.

In one embodiment, the phrase that the given signal corresponds to the given spatial relation means that a DMRS port of the given signal is QCL with a transmission antenna port of the given reference signal.

In one embodiment, the phrase that the given signal corresponds to the given spatial relation means that a DMRS port of the given signal is QCL with a transmission antenna port of the given reference signal, with the QCL type being QCL-TypeD.

Embodiment 25

Figure 25:
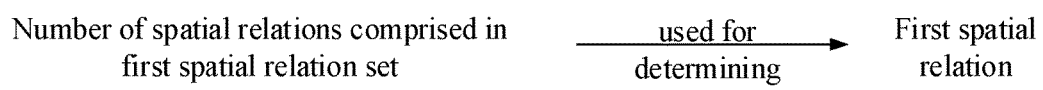
FIG. 25 illustrates a schematic diagram of a number of spatial relations comprised in a first spatial relation set being used for determining a first spatial relation according to one embodiment of the present disclosure.

Embodiment 25 illustrates a schematic diagram of a number of spatial relations comprised in a first spatial relation set being used for determining a first spatial relation according to one embodiment of the present disclosure; as shown in FIG. 25.

In one embodiment, when the number of spatial relations comprised in the first spatial relation set is equal to 1, the first spatial relation is a spatial relation comprised by the first spatial relation set.

In one embodiment, when the number of spatial relations comprised in the first spatial relation set is equal to 1, the first spatial relation is unrelated to the first spatial relation set.

In one embodiment, when the number of spatial relations comprised in the first spatial relation set is greater than 1, the first spatial relation is a spatial relation comprised by the first spatial relation set.

In one embodiment, when the number of spatial relations comprised in the first spatial relation set is greater than 1, the first spatial relation is unrelated to the first spatial relation set.

In one embodiment, the number of spatial relations comprised by the second spatial relation set and the number of spatial relations comprised by the first spatial relation set are jointly used for determining the first spatial relation.

In one embodiment, the size relation between the number of spatial relations comprised by the second spatial relation set and the number of spatial relations comprised by the first spatial relation set are used for determining the first spatial relation.

In one embodiment, when the number of spatial relations comprised by the first spatial relation set and the number of spatial relations comprised by the second spatial relation set are both equal to 1, the first spatial relation is a spatial relation comprised in the first spatial relation.

In one embodiment, when the number of spatial relations comprised by the first spatial relation set is equal to 1 and the number of spatial relations comprised by the second spatial relation set is greater than 1, the first spatial relation is unrelated to the first spatial relation set.

In one embodiment, when the number of spatial relations comprised by the first spatial relation set is greater than 1 and the number of spatial relations comprised by the second spatial relation set is equal to the number of spatial relations comprised by the first spatial relation set, the second spatial relation set is the first spatial relation set.

In one embodiment, when the number of spatial relations comprised by the first spatial relation set is greater than 1 and the number of spatial relations comprised by the second spatial relation set is equal to 1, the first spatial relation is unrelated to the first spatial relation set.

In one embodiment, when the number of spatial relations comprised by the first spatial relation set is greater than 1 and the number of spatial relations comprised by the second spatial relation set is equal to 1, the first spatial relation belongs to the first spatial relation set.

In one embodiment, when the number of spatial relations comprised by the second spatial relation set is equal to the number of spatial relations comprised by the first spatial relation set, the second spatial relation set is the first spatial relation set.

In one embodiment, when the number of spatial relations comprised by the second spatial relation set is unequal to the number of spatial relations comprised by the first spatial relation set, the first spatial relation is unrelated to the first spatial relation set.

In one embodiment, when the number of spatial relations comprised by the first spatial relation set is greater than the number of spatial relations comprised by the second spatial relation set, the first spatial relation belongs to the first spatial relation set.

In one embodiment, when the number of spatial relations comprised by the first spatial relation set is greater than the number of spatial relations comprised by the second spatial relation set, the first spatial relation is unrelated to the first spatial relation set.

In one embodiment, when the number of spatial relations comprised by the first spatial relation set is smaller than the number of spatial relations comprised by the second spatial relation set, the first spatial relation is unrelated to the first spatial relation set.

Embodiment 26

Embodiment 26 illustrates a schematic diagram of a number of spatial relations comprised in a first spatial relation set being used for determining a first spatial relation according to one embodiment of the present disclosure; as shown in FIG. 26. In Embodiment 26, if the first spatial relation set comprises K spatial relations, with K being greater than 1, the first spatial relation is one of the K spatial relations; the first spatial relation has a default position in the K spatial relations.

In one embodiment, if the first spatial relation set comprises the K spatial relations and the number of spatial relations comprised by the second spatial relation set is smaller than the K, the first spatial relation is one of the K spatial relations; the first spatial relation has a default position in the K spatial relations.

In one embodiment, when the first spatial relation set comprises the K spatial relations and the number of spatial relations comprised by the second spatial relation set is smaller than the K, the first spatial relation is one of the K spatial relations; the first spatial relation has a default position in the K spatial relations.

In one embodiment, K is equal to 2.

In one embodiment, K is greater than 2.

In one embodiment, the word default means being fixed.

In one embodiment, the word default means being pre-defined.

In one embodiment, the word default means there is no need for signaling indication.

In one embodiment, the word default means there is no need for indication by a dynamic signaling.

In one embodiment, the word default means there is no need for indication by a higher layer signaling.

In one embodiment, the K spatial relations respectively correspond to K first-type indexes, the K first-type indexes being non-negative integers respectively; the K first-type indexes are used for determining the first spatial relation out of the K spatial relations.

In one embodiment, the K first-type indexes are mutually unequal.

In one embodiment, the K first-type indexes are respectively used for identifying the K spatial relations.

In one embodiment, the K first-type indexes include a ControlResourceSetId.

In one embodiment, the K first-type indexes include a TCI-StateId.

In one embodiment, the K first-type indexes include an SRS-ResourceId.

In one embodiment, the K first-type indexes include an NZP-CSI-RS-ResourceId.

In one embodiment, the K first-type indexes include an SSB-Index.

In one embodiment, the phrase that the first spatial relation has a default position in the K spatial relations means that a first-type index corresponding to the first spatial relation is a smallest one of the K first-type indexes.

In one embodiment, the phrase that the first spatial relation has a default position in the K spatial relations means that a first-type index corresponding to the first spatial relation is a largest one of the K first-type indexes.

In one embodiment, the phrase that the first spatial relation has a default position in the K spatial relations means that a second information block indicates the K spatial relations sequentially, and the first spatial relation is a spatial relation ranking first among the K spatial relations.

In one embodiment, the phrase that the first spatial relation has a default position in the K spatial relations means that a second information block indicates the K spatial relations sequentially, and the first spatial relation is a spatial relation ranking last among the K spatial relations.

In one embodiment, the second information block is carried by an RRC signaling.

In one embodiment, the second information block indicates the K first-type indexes sequentially.

In one embodiment, the second information block is carried by a second signaling.

In one embodiment, the second information block is carried by a third signaling.

In one embodiment, the phrase that the first spatial relation has a default position in the K spatial relations means that the second signaling indicates the P candidate spatial relations sequentially; and a position of the first spatial relation among the P candidate spatial relations is before that of any other spatial relation out of the K spatial relations different from the first spatial relation.

Embodiment 27

Embodiment 27 illustrates a schematic diagram of a number of spatial relations comprised in a first spatial relation set being used for determining a first spatial relation according to one embodiment of the present disclosure; as shown in FIG. 27. In Embodiment 27, if the first spatial relation set comprises K spatial relations, with K being greater than 1, the first spatial relation is one of the K spatial relations; time-frequency resources occupied by the first signaling are used by the first node for determining the first spatial relation out of the K spatial relations.

In one embodiment, if the first spatial relation set comprises the K spatial relations and the number of spatial relations comprised by the second spatial relation set is smaller than the K, the first spatial relation is one of the K spatial relations; time-frequency resources occupied by the first signaling are used for determining the first spatial relation out of the K spatial relations.

In one embodiment, when the first spatial relation set comprises the K spatial relations and the number of spatial relations comprised by the second spatial relation set is smaller than the K, the first spatial relation is one of the K spatial relations; time-frequency resources occupied by the first signaling are used for determining the first spatial relation out of the K spatial relations.

In one embodiment, time-frequency resources occupied by the first signaling are used for determining a second index, and the second index is used for determining the first spatial relation out of the K spatial relations; the second index is a non-negative integer.

In one embodiment, the K spatial relations respectively correspond to K value sets; the first spatial relation corresponds to a first value set of the K value sets, and the second index's value belongs to the first value set; any one of the K value sets comprises a positive integer number of non-negative integer(s), and there isn't any non-negative integer belonging to two of the K value sets at the same time.

In one embodiment, the K is equal to 2, the K spatial relations including a second spatial relation and a third spatial relation; if the second index mod 2 is equal to 0, the first spatial relation is the second spatial relation; if the second index mod 2 is equal to 1, the first spatial relation is the third spatial relation.

In one subembodiment, the K spatial relations respectively correspond to K first-type indexes, and a first-type index corresponding to the second spatial relation is smaller than a first-type index corresponding to the third spatial relation.

In one subembodiment, the K spatial relations respectively correspond to K first-type indexes, and a first-type index corresponding to the second spatial relation is greater than a first-type index corresponding to the third spatial relation.

In one subembodiment, a second information block indicates the K spatial relations sequentially, and the second spatial relation is prior to the third spatial relation.

In one subembodiment, the second signaling indicates the P candidate spatial relations sequentially; and the second spatial relation is prior to the third spatial relation among the P candidate spatial relations.

In one embodiment, the second index is an index of a first CCE occupied by the first signaling.

In one embodiment, a first CCE occupied by the first signaling is a first CCE, and the second index is an index of the first CCE in a CORESET that the first CCE belongs to.

In one embodiment, the second index is an index of a first REG occupied by the first signaling.

In one embodiment, the second index is an index of a PDCCH candidate occupied by the first signaling.

In one embodiment, a PDCCH candidate occupied by the first signaling is a first PDCCH candidate, and the second index is an index of the first PDCCH candidate in a search space set to which the first PDCCH candidate belongs.

In one embodiment, the second index is an index of a first PRB occupied by the first signaling.

In one embodiment, the second index is an index of a slot occupied by the first signaling.

In one embodiment, the K spatial relation respectively correspond to K time-frequency resource sets; the first spatial relation corresponds to a first time-frequency resource set of the K time-frequency resource sets, and time-frequency resources occupied by the first signaling belong to the first time-frequency resource set; the K time-frequency resource sets are mutually orthogonal in time-frequency domain.

In one embodiment, each CCE occupied by the first signaling corresponds to one and only one spatial relation out of the K spatial relations, and the first spatial relation is a spatial relation corresponding to a first CCE occupied by the first signaling.

In one embodiment, each REG occupied by the first signaling corresponds to one and only one spatial relation out of the K spatial relations, and the first spatial relation is a spatial relation corresponding to a first REG occupied by the first signaling.

In one embodiment, when the first spatial relation set comprises K spatial relations and K is a positive integer greater than 1, the first spatial relation is one of the K spatial relations, only one of the K spatial relations is used for receiving the first signaling; the first spatial relation is a spatial relation used for receiving the first signaling.

Embodiment 28

Embodiment 28 illustrates a schematic diagram of a number of spatial relations comprised in a first spatial relation set being used for determining a first spatial relation according to one embodiment of the present disclosure; as shown in FIG. 28. In Embodiment 28, if the first spatial relation set comprises K spatial relations, with K being a positive integer, the first spatial relation is a spatial relation corresponding to the second resource pool.

In one embodiment, if the first spatial relation set comprises the K spatial relations and the number of spatial relations comprised by the second spatial relation set is smaller than the K, the first spatial relation is a spatial relation corresponding to the second resource pool.

In one embodiment, when the first spatial relation set comprises the K spatial relations and the number of spatial relations comprised by the second spatial relation set is smaller than the K, the first spatial relation is a spatial relation corresponding to the second resource pool.

In one embodiment, the second resource pool corresponds to the first spatial relation.

In one embodiment, the second resource pool only corresponds to the first spatial relation.

In one embodiment, the phrase that the second resource pool corresponds to only one spatial relation means that the second resource pool only corresponds to one activated spatial relation.

In one embodiment, the phrase that the second resource pool corresponds to only one spatial relation means that transmission antenna ports of any two radio signals transmitted in the second resource pool are QCL.

In one embodiment, the phrase that the second resource pool corresponds to only one spatial relation means that transmission antenna ports of any two radio signals transmitted in the second resource pool are QCL, with a corresponding QCL type being QCL-TypeD.

In one embodiment, the phrase that the second resource pool corresponds to only one spatial relation means that any two radio signals transmitted in the second resource pool are received by a same spatial domain filter.

In one embodiment, the phrase that the second resource pool corresponds to only one spatial relation means that any two radio signals transmitted in the second resource pool are transmitted by a same spatial domain filter.

In one embodiment, the second resource pool comprises a time-domain resource.

In one embodiment, the second resource pool comprises a frequency-domain resource.

In one embodiment, the second resource pool comprises a code-domain resource.

In one embodiment, the second resource pool occupies a positive integer number of RE(s) in time-frequency domain.

In one embodiment, the second resource pool occupies a positive integer number of subcarrier(s) in frequency domain.

In one embodiment, the second resource pool occupies a positive integer number of PRB(s) in frequency domain.

In one embodiment, the second resource pool occupies a positive integer number of multicarrier symbol(s) in time domain.

In one embodiment, the second resource pool occupies a positive integer number of slot(s) in time domain.

In one embodiment, the second resource pool occurs only once in time domain.

In one embodiment, the second resource pool occurs periodically in time domain.

In one embodiment, the second resource pool occurs aperiodically in time domain.

In one embodiment, the second resource pool comprises a CORESET.

In one embodiment, the second resource pool comprises a search space.

In one embodiment, the second resource pool comprises a search space set.

In one embodiment, the second resource pool comprises a positive integer number of PDCCH candidate(s).

In one embodiment, the second resource pool comprises multiple CCEs.

In one embodiment, the second resource pool comprises multiple REGs.

In one embodiment, a correspondence relation between the first spatial relation and the second resource pool is configured by an RRC signaling.

In one embodiment, a correspondence relation between the first spatial relation and the second resource pool is configured by an RRC signaling and a MAC CE signaling together.

In one embodiment, a fourth signaling indicates P1 spatial relations, P1 being a positive integer greater than 1, and the first spatial relation is one of the P1 spatial relations; a fifth signaling activates the first spatial relation out of the P1 spatial relations; the fourth signaling is an RRC signaling, while the fifth signaling is a MAC CE signaling.

Embodiment 29

Embodiment 29 illustrates a schematic diagram of time-frequency resources occupied by a first signal being used for determining a second resource pool according to one embodiment of the present disclosure; as shown in FIG. 29. In Embodiment 29, a time-domain resource occupied by the first signal is used for determining a first time unit, and a frequency-domain resource occupied by the first signal is used for determining a first frequency-domain zone, and the second resource pool is monitored by the first node in the first time unit and belongs to the first frequency-domain zone in frequency domain.

In one embodiment, the second resource pool and the first signal belong to a same Bandwidth part (BWP) in frequency domain.

In one embodiment, the second resource pool and the first signal belong to a same serving cell in frequency domain.

In one embodiment, the second resource pool is one of S candidate resource pools, S being a positive integer greater than 1; any one of the S candidate resource pools is monitored by the first node in the first time unit and belongs to the first frequency-domain zone in frequency domain; the S candidate resource pools respectively correspond to S second-type indexes, and the S second-type indexes are used for determining the second resource pool out of the S candidate resource pools.

In one subembodiment, any of the S candidate resource pools only corresponds to one spatial relation.

In one subembodiment, any of the S candidate resource pools is a CORESET configured for the first node.

In one subembodiment, any of the S candidate resource pools is a search space set configured for the first node.

In one subembodiment, a second-type index corresponding to the second resource pool is a smallest second-type index among the S second-type indexes.

In one subembodiment, a second-type index corresponding to the second resource pool is a largest second-type index among the S second-type indexes.

In one subembodiment, the S second-type indexes are respectively non-negative integers.

In one subembodiment, the S second-type indexes are respectively used for identifying the S candidate resource pools.

In one subembodiment, the S second-type indexes are respectively ControlResourceSetIds.

In one subembodiment, the S second-type indexes are respectively SearchSpaceIds.

In one subembodiment, the S second-type indexes are respectively TCI-StateIds.

In one embodiment, the time unit is a consecutive duration.

In one embodiment, the time unit is a slot.

In one embodiment, the time unit is a span.

In one embodiment, the time unit comprises a positive integer number of multicarrier symbol(s).

In one embodiment, the first time unit is no later than the first signal.

In one embodiment, the first time unit is a last time unit no later than the first signal, in which the first node monitors one or more CORESETs in the first frequency-domain zone.

In one embodiment, the first time unit is a last time unit no later than the first signal, in which the first node monitors one or more search space sets in the first frequency-domain zone.

In one embodiment, the phrase that the first time unit is no later than the first signal means that an end time of the first time unit is no later than an end time of the first signal.

In one embodiment, the phrase that the first time unit is no later than the first signal means that an end time of the first time unit is no later than a start time of the first signal.

In one embodiment, the phrase that the first time unit is no later than the first signal means that a start time of the first time unit is no later than a start time of the first signal.

In one embodiment, the phrase that the first time unit is no later than the first signal means that an end time of the first time unit is no later than an end time of a time unit to which the first signal belongs.

In one embodiment, the phrase that the first time unit is no later than the first signal means that an end time of the first time unit is no later than a start time of a time unit to which the first signal belongs.

In one embodiment, the phrase that the first time unit is no later than the first signal means that a start time of the first time unit is no later than a start time of a time unit to which the first signal belongs.

In one embodiment, a time interval between a start time of the first time unit and a start time of the first signal is no greater than a second threshold, the second threshold being a positive integer.

In one embodiment, a time interval between a start time of the first time unit and a start time of a time unit to which the first signal belongs is no greater than a second threshold, the second threshold being a positive integer.

In one embodiment, the second threshold is pre-defined.

In one embodiment, the second threshold is configured by RRC.

In one embodiment, the second threshold is measured by the time unit.

In one embodiment, the first frequency-domain zone is a consecutive frequency-domain zone.

In one embodiment, the first frequency-domain zone comprises a positive integer number of consecutive PRBs.

In one embodiment, the first frequency-domain zone comprises a BWP to which the first signal belongs.

In one embodiment, the first frequency-domain zone comprises a serving cell to which the first signal belongs.

In one embodiment, the first frequency-domain zone comprises a carrier to which the first signal belongs.

In one embodiment, the monitoring refers to blind decoding, which means receiving a signal and performing decoding, and then determining whether a signaling is received according to a CRC bit.

In one embodiment, the monitoring refers to receiving based on coherent detection, namely performing coherent reception and determining whether a signaling is received according to energy of a signal obtained through the coherent reception.

In one embodiment, the monitoring refers to receiving based on energy detection, namely sensing energy of a radio signal and determining whether a signaling is received according to an average received energy.

Embodiment 30

Embodiment 30 illustrates a schematic diagram of a first resource pool corresponding to a first spatial relation set according to one embodiment of the present disclosure; as shown in FIG. 30. In Embodiment 30, the first spatial relation set comprises K spatial relations and K is a positive integer greater than 1, and the K spatial relations respectively indicate K reference signal resources; the K reference signal resources are respectively reserved for K reference signals; the first resource pool corresponds to each spatial relation among the K spatial relations.

In one embodiment, the K reference signal resources include a CSI-RS resource.

In one embodiment, the K reference signal resources include a CSI-RS resource set.

In one embodiment, the K reference signal resources include an SSB resource.

In one embodiment, the K reference signal resources include an SRS resource.

In one embodiment, the K reference signal resources include an SRS resource sets.

In one embodiment, any of the K reference signals is one of a CSI-RS, an SSB or an SRS.

In one embodiment, any two of the K reference signals cannot be assumed as QCL.

In one embodiment, each of the K reference signal resources corresponds to a QCL type of QCL-TypeD.

In one embodiment, the phrase that the first resource pool corresponds to a first spatial relation set means that the first spatial relation set comprises the K spatial relations; the K spatial relations are respectively used for determining K antenna port groups; a radio signal transmitted in the first resource pool is transmitted by the K antenna port groups.

In one subembodiment, a radio signal transmitted in the first resource pool is transmitted through Time Division Multiplexing (TDM), Frequency Division Multiplexing (FDM) or Spatial Division Multiplexing (SDM) by the K antenna port groups.

In one subembodiment, the K reference signals are respectively transmitted by the K antenna port groups.

In one embodiment, an antenna port group comprises one or more antenna ports.

In one embodiment, any two antenna ports belonging to different antenna port groups among the K antenna port groups cannot be assumed as QCL.

In one embodiment, any two antenna ports belonging to different antenna port groups among the K antenna port groups cannot be assumed as QCL, with a corresponding QCL type being QCL-TypeD.

In one embodiment, a channel that a radio signal transmitted from an antenna port goes through can be used to infer a channel that another radio signal transmitted from the antenna port goes through.

In one embodiment, a channel that a radio signal transmitted from an antenna port goes through cannot be used to infer a channel that another radio signal transmitted from the antenna port goes through.

In one embodiment, the phrase that the first resource pool corresponds to a first spatial relation set means that the first spatial relation set comprises the K spatial relations; the K spatial relations are respectively used for determining K different spatial Rx parameters; a radio signal transmitted in the first resource pool is received by the K different spatial Rx parameters.

In one subembodiment, a radio signal transmitted in the first resource pool is received through TDM, FDM or SDM by the K different spatial Rx parameters.

In one subembodiment, the first node receives the K reference signals respectively employing the K different spatial Rx parameters.

In one embodiment, the phrase that the first resource pool corresponds to a first spatial relation set means that the first spatial relation set comprises the K spatial relations; the K spatial relations are respectively used for determining K different spatial domain filters; a radio signal transmitted in the first resource pool is received by the K different spatial domain filters.

In one subembodiment, a radio signal transmitted in the first resource pool is received through TDM, FDM or SDM by the K different spatial domain filters.

In one embodiment, the phrase that the first resource pool corresponds to a first spatial relation set means that the first spatial relation set comprises the K spatial relations; the K spatial relations are respectively used for determining K different spatial domain filters; a radio signal transmitted in the first resource pool is transmitted by the K different spatial domain filters.

In one subembodiment, a radio signal transmitted in the first resource pool is transmitted through TDM, FDM or SDM by the K different spatial domain filters in the first resource pool.

In one embodiment, the K reference signals respectively correspond to the K different spatial domain filters; for any given reference signal of the K reference signals, the first node employs a spatial domain filter corresponding to the given reference signal to receive or transmit the given reference signal.

In one embodiment, the phrase that the first resource pool corresponds to a first spatial relation set means that the first spatial relation set comprises the K spatial relations; the first resource pool is divided into K resource sub-pools, and the K resource sub-pools respectively correspond to the K spatial relations.

In one embodiment, the first resource pool consists of the K resource sub-pools.

In one embodiment, any of the K resource sub-pools occupies a positive integer number of RE(s) in time-frequency domain.

In one embodiment, any of the K resource sub-pools occupies a positive integer number of PDCCH candidate(s).

In one embodiment, any of the K resource sub-pools occupies a positive integer number of CCE(s).

In one embodiment, any of the K resource sub-pools occupies a positive integer number of REG(s).

In one embodiment, any of the K resource sub-pools comprises a time-domain resource and a frequency-domain resource.

In one embodiment, any of the K resource sub-pools comprises a time-domain resource, a frequency-domain resource and a frequency-domain resource.

In one embodiment, any two of the K resource sub-pools occupy mutually orthogonal time-frequency resources.

In one embodiment, any two of the K resource sub-pools occupy mutually orthogonal time-domain resources.

In one embodiment, any two of the K resource sub-pools occupy a same frequency-domain resource.

In one embodiment, any two of the K resource sub-pools occupy mutually orthogonal frequency-domain resources.

In one embodiment, any two of the K resource sub-pools occupy a same time-domain resource.

In one embodiment, any two of the K resource sub-pools occupy a same time-frequency resource and different DMRS ports.

In one embodiment, any two of the K resource sub-blocks occupy a same time-frequency resource and different DMRS CDM groups.

Embodiment 31

Embodiment 31 illustrates a schematic diagram of a first resource pool corresponding to a first spatial relation set according to one embodiment of the present disclosure; as shown in FIG. 31. In Embodiment 31, the first spatial relation set only comprises one spatial relation, and the spatial relation comprised in the first spatial relation set is a fourth spatial relation, the fourth spatial relation indicates a third reference signal resource, and the third reference signal resource is reserved for a third reference signal; the first resource pool corresponds to the fourth spatial relation.

In one embodiment, the third reference signal resource is one of a CSI-RS resource, a CSI-RS resource set, an SSB resource, an SRS resource or an SRS resource set.

In one embodiment, the third reference signal is one of a CSI-RS, an SSB resource or an SRS.

In one embodiment, the phrase that the first resource pool corresponds to a first spatial relation set means that the first spatial relation set only comprises the fourth spatial relation; the fourth spatial relation is used for determining a first antenna port group; any radio signal transmitted in the first resource pool is transmitted by the first antenna port group.

In one subembodiment, the third reference signal is transmitted by the first antenna port group.

In one embodiment, the phrase that the first resource pool corresponds to a first spatial relation set means that the first spatial relation set only comprises the fourth spatial relation; the fourth spatial relation is used for determining a first spatial domain filter; any radio signal transmitted in the first resource pool is received or transmitted by the first spatial domain filter.

In one subembodiment, the first node employs the first spatial domain filter to receive or transmit the third reference signal.

Embodiment 32

Embodiment 32 illustrates a schematic diagram of a given resource pool corresponding to a given spatial relation according to one embodiment of the present disclosure; as shown in FIG. 32. In Embodiment 32, the given resource pool corresponds to the given spatial relation; the given spatial relation indicates a given reference signal resource, and the given reference signal resource is reserved for a given reference signal.

In one embodiment, the given resource pool is the first resource pool, and the given spatial relation is any spatial relation in the first spatial relation set.

In one embodiment, the given resource pool is any resource sub-pool out of the K resource sub-pools, and the given spatial relation is one of the K spatial relations corresponding to the given resource pool.

In one embodiment, a QCL type corresponding to the given reference signal resource is QCL-TypeD.

In one embodiment, the phrase that the given resource pool corresponds to the given spatial relation means that large-scale properties of a channel that the given reference signal goes through can be used to infer large-scale properties of a channel that a radio signal transmitted in the given resource pool goes through.

In one embodiment, the phrase that the given resource pool corresponds to the given spatial relation means that a spatial domain filter corresponding to the given reference signal is used for determining a spatial domain filter corresponding to a radio signal transmitted in the given resource pool.

In one embodiment, the phrase that the given resource pool corresponds to the given spatial relation means that the first node employs a same spatial domain filter to receive the given reference signal and to receive a radio signal in the given resource pool.

In one embodiment, the phrase that the given resource pool corresponds to the given spatial relation means that the first node employs a same spatial domain filter to transmit the given reference signal and to receive a radio signal in the given resource pool.

In one embodiment, the phrase that the given resource pool corresponds to the given spatial relation means that a DMRS port corresponding to the given resource pool is QCL with a transmission antenna port of the given reference signal.

In one embodiment, the phrase that the given resource pool corresponds to the given spatial relation means that a DMRS port corresponding to the given resource pool is QCL with a transmission antenna port of the given reference signal, with a corresponding QCL type being QCL-TypeD.

Embodiment 33

Embodiment 33 illustrates a schematic diagram of a first signal corresponding to each spatial relation in a second spatial relation set according to one embodiment of the present disclosure; as shown in FIG. 33.

In one embodiment, the number of spatial relations comprised in the second spatial relation set is used by the first node for determining the first spatial relation.

In one embodiment, the number of spatial relations comprised in the second spatial relation set is equal to 1.

In one embodiment, the number of spatial relations comprised in the second spatial relation set is greater than 1.

In one embodiment, the number of spatial relations comprised in the second spatial relation set is equal to 2.

In one embodiment, the number of spatial relations comprised in the second spatial relation set is equal to either 1 or 2.

In one embodiment, each spatial relation in the second spatial relation set indicates a reference signal resource.

In one embodiment, there is a spatial relation in the second spatial relation set that indicates two reference signal resources, the two reference signal resources respectively corresponding to different QCL types.

In one embodiment, the second spatial relation set comprises Q spatial relations, Q being a positive integer greater than 1; the first signal comprises Q sub-signals, and spatial relations corresponding to the Q sub-signals are respectively the Q spatial relations.

In one subembodiment, the Q is equal to 2.

In one subembodiment, the Q is greater than 2.

In one subembodiment, the Q sub-signals occupy a same time-frequency resource, and the Q sub-signals respectively correspond to different DMRS CDM groups.

In one subembodiment, any two of the Q sub-signals occupy mutually orthogonal time-frequency resources.

In one subembodiment, any two of the Q sub-signals occupy mutually orthogonal time-domain resources.

In one subembodiment, any two of the Q sub-signals occupy mutually orthogonal frequency-domain resources.

Embodiment 34

Embodiment 34 illustrates a schematic diagram of a first information block according to one embodiment of the present disclosure; as shown in FIG. 34. In Embodiment 34, the first information block indicates a first parameter, the first parameter is a higher layer parameter, and the first parameter is used for determining the number of spatial relations comprised by the second spatial relation set.

In one embodiment, the first information block is carried by a higher layer signaling.

In one embodiment, the first information block is carried by an RRC signaling.

In one embodiment, the first information block is carried by a MAC CE signaling.

In one embodiment, the first information block comprises information in all or part of fields in an IE.

In one embodiment, the first information block comprises information in all or part of fields in a PDSCH-Config IE.

In one embodiment, the first information block and the first signaling are jointly used for determining the number of spatial relations comprised by the second spatial relation set.

In one embodiment, the first parameter and the first signaling are jointly used for determining the number of spatial relations comprised by the second spatial relation set.

In one embodiment, the first parameter indicates a number of repetitions of transmission of the first bit block in time domain.

In one embodiment, the first parameter is used for determining a length of a time-domain resource occupied by the first signal.

In one embodiment, the first parameter indicates a retransmission mechanism of the first bit block.

In one embodiment, the first parameter indicates a number of repetitions of transmission of the first bit block.

In one embodiment, the first parameter indicates whether each repetition of the first bit block is TDM, FDM or SDM.

In one embodiment, the first parameter comprises information in a higher layer parameter pdsch-AggregationFactor.

In one embodiment, the first parameter comprises information in a higher layer parameter Rep SchemeEnabler.

In one embodiment, if the first parameter's value belongs to a first parameter value set, the number of spatial relations comprised in the second spatial relation set is greater than 1; if the first parameter's value belongs to a second parameter value set, the number of spatial relations comprised in the second spatial relation set is equal to 1; there isn't any parameter value belonging to the first parameter value set and the second parameter value set simultaneously.

In one subembodiment, if the first parameter's value belongs to a first parameter value set, the number of spatial relations comprised in the second spatial relation set is equal to 2.

In one subembodiment, any parameter value in the first parameter value set is a positive integer, any parameter value in the second parameter value set is a positive integer.

In one subembodiment, any parameter value in the first parameter value set is a positive integer greater than 1.

In one subembodiment, the second parameter value set only comprises 1.

In one embodiment, if the first parameter's value belongs to a third parameter value set, the number of spatial relations comprised in the second spatial relation set is greater than 1; if the first parameter's value belongs to a fourth parameter value set, a second field of the first signaling is used for determining the number of spatial relations comprised in the second spatial relation set; there isn't any parameter value belonging to the third parameter value set and the fourth parameter value set simultaneously.

In one subembodiment, any parameter value in the third parameter value set and any parameter value in the fourth parameter value set belong to a first candidate parameter value set, and the first candidate parameter value set comprises FDMSchemeA, FDMSchemeB, TDMSchemeA and TDMSchemeB.

In one subembodiment, the third parameter value set comprises FDMSchemeA, FDMSchemeB and TDMSchemeA, while the second parameter value set comprises TDMSchemeB.

In one subembodiment, the second field of the first signaling indicates a second value, the second value indicates a number of repetitions of the first signal in time domain, the second value being a positive integer; if the first parameter's value belongs to the fourth parameter value set and the second value is greater than 1, the number of spatial relations comprised in the second spatial relation set is greater than 1; if the first parameter's value belongs to the fourth parameter value set and the second value is equal to 1, the number of spatial relations comprised in the second spatial relation set is equal to 1.

In one subembodiment, if the first parameter's value belongs to the fourth parameter value set and the second value is greater than 1, the number of spatial relations comprised in the second spatial relation set is equal to 2.

In one subembodiment, the second field of the first signaling comprises all or part of information in a Time domain resource assignment field.

In one subembodiment, the second field of the first signaling indicates a time-domain resource occupied by the first signal.

In one subembodiment, a parameter RepNumR16 indicates the second value.

In one embodiment, the number of spatial relations comprised in the first spatial relation set is used for determining the number of spatial relations comprised in the second spatial relation set.

In one embodiment, the number of spatial relations comprised in the second spatial relation set is equal to the number of spatial relations comprised in the first spatial relation set.

In one embodiment, the first information block and the number of spatial relations comprised in the first spatial relation set are jointly used for determining the number of spatial relations comprised in the second spatial relation set.

In one embodiment, the first parameter's value and the number of spatial relations comprised in the first spatial relation set are jointly used for determining the number of spatial relations comprised in the second spatial relation set.

In one embodiment, if the first parameter's value belongs to a third parameter value set, the number of spatial relations comprised in the second spatial relation set is equal to the number of spatial relations comprised in the first spatial relation set.

In one embodiment, the first information block is transmitted on a PDSCH.

In one embodiment, the first information block is transmitted on a PSSCH.

Embodiment 35

Embodiment 35 illustrates a schematic diagram of a first information block according to one embodiment of the present disclosure; as shown in FIG. 35. In Embodiment 35, the first information block indicates whether a first parameter is configured, the first parameter is a higher layer parameter, and whether the first parameter is configured is used for determining the number of spatial relations comprised in the second spatial relation set.

In one embodiment, if the first parameter is configured, the number of spatial relations comprised in the second spatial relation set is greater than 1.

In one embodiment, if the first parameter is configured, the first parameter's value is used for determining the number of spatial relations comprised in the second spatial relation set.

In one embodiment, if the first parameter is not configured, the number of spatial relations comprised in the second spatial relation set is equal to 1.

In one embodiment, if the first parameter is not configured, a third field of the first signaling is used for determining the number of spatial relations comprised in the second spatial relation set.

In one subembodiment, the third field of the first signaling indicates a third value, and the third value is a number of DMRS CDM groups corresponding to the first signal; the number of spatial relations comprised in the second spatial relation set is equal to the third value.

In one subembodiment, the third field comprises all or part of information in an Antenna port(s) field.

In one embodiment, whether the first parameter is configured and the number of spatial relations comprised in the first spatial relation set are jointly used for determining the number of spatial relations comprised in the second spatial relation set.

In one embodiment, if the first parameter is not configured, the number of spatial relations comprised in the second spatial relation set is equal to the number of spatial relations comprised in the first spatial relation set.

Embodiment 36

Embodiment 36 illustrates a schematic diagram of a time interval between a first signaling and a first signal being no smaller than a first threshold according to one embodiment of the present disclosure; as shown in FIG. 36.

In one embodiment, the time interval between the first signaling and the first signal is equal to the first threshold.

In one embodiment, the time interval between the first signaling and the first signal is greater than the first threshold.

In one embodiment, the time interval between the first signaling and the first signal refers to a time interval between a start time of the first signaling and a start time of the first signal.

In one embodiment, the time interval between the first signaling and the first signal refers to a time interval between an end time of the first signaling and a start time of the first signal.

In one embodiment, the time interval between the first signaling and the first signal refers to a time interval between an end time of the first signaling and an end time of the first signal.

In one embodiment, the time interval between the first signaling and the first signal refers to a time interval between a start time of a time unit to which the first signaling belongs and a start time of a time unit to which the first signal belongs.

In one embodiment, the time interval between the first signaling and the first signal refers to a time interval between an end time of a time unit to which the first signaling belongs and a start time of a time unit to which the first signal belongs.

In one embodiment, the time interval between the first signaling and the first signal refers to a time interval between an end time of a time unit to which the first signaling belongs and an end time of a time unit to which the first signal belongs.

In one embodiment, the time interval between the first signaling and the first signal is measured by the time unit.

In one embodiment, the time interval between the first signaling and the first signal is measured by slots.

In one embodiment, the time interval between the first signaling and the first signal is measured by spans.

In one embodiment, the time interval between the first signaling and the first signal is measured by multicarrier symbols.

In one embodiment, the unit of the first threshold is that of the time interval between the first signaling and the first signal.

In one embodiment, the first threshold is a non-negative integer.

In one embodiment, the first threshold is timeDurationForQCL.

In one embodiment, the first threshold is configured by an RRC signaling.

In one embodiment, the first threshold is pre-defined.

Embodiment 37

Embodiment 37 illustrates a structure block diagram of a processing device in a first node according to one embodiment of the present disclosure; as shown in FIG. 37. In FIG. 37, a processing device 3700 in a first node comprises a first receiver 3701 and a first processor 3702.

In Embodiment 37, the first receiver 3701 receives a first signaling in a first resource pool; the first processor 3702 receives a first signal.

In Embodiment 37, the first signaling indicates scheduling information of the first signal; the first resource pool corresponds to a first spatial relation set; the first signaling does not comprise a first field, the first field indicating a spatial relation corresponding to a signal scheduled by a signaling to which the first field belongs; the first signal corresponds to a first spatial relation, and a number of spatial relations comprised in the first spatial relation set is used for determining the first spatial relation.

In one embodiment, when the first spatial relation set comprises K spatial relations and K is a positive integer greater than 1, the first spatial relation is one of the K spatial relations; and the first spatial relation has a default position among the K spatial relations.

In one embodiment, when the first spatial relation set comprises K spatial relations and K is a positive integer greater than 1, the first spatial relation is one of the K spatial relations; time-frequency resources occupied by the first signaling are used for determining the first spatial relation out of the K spatial relations.

In one embodiment, when the first spatial relation set comprises K spatial relations and K is a positive integer greater than 1, the first spatial relation is a spatial relation corresponding to a second resource pool; the second resource pool corresponds to only one spatial relation, and time-frequency resources occupied by the first signal are used for determining the second resource pool.

In one embodiment, the first signal corresponds to each spatial relation in a second spatial relation set, and the first spatial relation belongs to the second spatial relation set; a number of spatial relations comprised in the second spatial relation set is used for determining the first spatial relation.

In one embodiment, the first processor 3702 receives a first information block; herein, the first information block is used for determining the number of spatial relations comprised in the second spatial relation set.

In one embodiment, the time interval between the first signaling and the first signal is no smaller than a first threshold.

In one embodiment, the first node is a UE.

In one embodiment, the first node is a relay node.

In one embodiment, the first receiver 3701 comprises at least one of the antenna 452, the receiver 454, the receiving processor 456, the multi-antenna receiving processor 458, the controller/processor 459, the memory 460 or the data source 467 in Embodiment 4.

In one embodiment, the first processor 3702 comprises at least one of the antenna 452, the receiver 454, the receiving processor 456, the multi-antenna receiving processor 458, the controller/processor 459, the memory 460 or the data source 467 in Embodiment 4.

Embodiment 38

Embodiment 38 illustrates a structure block diagram of a processing device in a second node according to one embodiment of the present disclosure; as shown in FIG. 38. In FIG. 38, a processing device 3800 in a second node comprises a first transmitter 3801 and a second processor 3802.

In Embodiment 38, the first transmitter 3801 transmits a first signaling in a first resource pool; the second processor 3802 transmits a first signal.

In Embodiment 38, the first signaling indicates scheduling information of the first signal; the first resource pool corresponds to a first spatial relation set; the first signaling does not comprise a first field, the first field indicating a spatial relation corresponding to a signal scheduled by a signaling to which the first field belongs; the first signal corresponds to a first spatial relation, and a number of spatial relations comprised in the first spatial relation set is used for determining the first spatial relation.

In one embodiment, when the first spatial relation set comprises K spatial relations and K is a positive integer greater than 1, the first spatial relation is one of the K spatial relations; and the first spatial relation has a default position among the K spatial relations.

In one embodiment, when the first spatial relation set comprises K spatial relations and K is a positive integer greater than 1, the first spatial relation is one of the K spatial relations; time-frequency resources occupied by the first signaling are used for determining the first spatial relation out of the K spatial relations.

In one embodiment, when the first spatial relation set comprises K spatial relations and K is a positive integer greater than 1, the first spatial relation is a spatial relation corresponding to a second resource pool; the second resource pool corresponds to only one spatial relation, and time-frequency resources occupied by the first signal are used for determining the second resource pool.

In one embodiment, the first signal corresponds to each spatial relation in a second spatial relation set, and the first spatial relation belongs to the second spatial relation set; a number of spatial relations comprised in the second spatial relation set is used for determining the first spatial relation.

In one embodiment, the second processor 3802 transmits a first information block; herein, the first information block is used for determining the number of spatial relations comprised in the second spatial relation set.

In one embodiment, the time interval between the first signaling and the first signal is no smaller than a first threshold.

In one embodiment, the second node is a base station.

In one embodiment, the second node is a UE.

In one embodiment, the second node is a relay node.

In one embodiment, the first transmitter 3801 comprises at least one of the antenna 420, the transmitter 418, the transmitting processor 416, the multi-antenna transmitting processor 471, the controller/processor 475 or the memory 476 in Embodiment 4.

In one embodiment, the second processor 3802 comprises at least one of the antenna 420, the transmitter 418, the transmitting processor 416, the multi-antenna transmitting processor 471, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving a first information block; and
a first processor, operating first-type information in a first radio resource block;
wherein the first information block is used for determining a first radio resource set and K information units, K being a positive integer greater than 1; the first radio resource block belongs to the first radio resource set; the K information units respectively indicate K spatial relations; a first condition set is used for determining whether a spatial relation corresponding to the operation performed in the first radio resource block is related to the K information units; the first condition set is related to a first parameter, and the first parameter is used for determining whether the first radio resource set corresponds to multiple spatial relations; when the spatial relation corresponding to the operation performed in the first radio resource block is related to the K information units, one or more information units of the K information units are used for determining the spatial relation corresponding to the operation performed in the first radio resource block; the operating is monitoring, or the operating is transmitting; when the operating is monitoring, the first radio resource block comprises at least one PDCCH candidate, and the first-type information comprises DCI; when the operating is transmitting, the first radio resource block is a PUCCH resource, and the first-type information comprises UCI; the first condition set comprises M condition subsets, M being a positive integer greater than 1; when one condition subset in the first condition set is fulfilled, one or more information units of the K information units are used for determining the spatial relation corresponding to the operation performed in the first radio resource block; when none of condition subsets in the first condition set is fulfilled, a first reference signal resource is used for determining the spatial relation corresponding to the operation performed in the first radio resource block, and the first reference signal resource is unrelated to the K information units.

2. The first node according to claim 1, wherein when K1 information units of the K information units are used for determining the spatial relation corresponding to the operation performed in the first radio resource block and K1 is a positive integer greater than 1, the first radio resource block is divided into K1 resource sub-blocks, and the K1 information units are used for respectively determining the spatial relations corresponding to the operation performed in the K1 resource sub-blocks.

3. The first node according to claim 1, wherein the first condition set comprises a first condition subset, the first condition subset comprising that the first parameter is not configured and that a second-type signaling is received in a first time window; the second-type signaling is used for activating one of the K information units; the first radio resource block is used for determining the first time window;
or, the first condition set comprises a second condition subset and a third condition subset; the second condition subset comprises that the first parameter is configured and that K is no greater than P; the third condition subset comprises that the first parameter is configured, K is greater than P and that a second-type signaling is received in a first time window; the first parameter indicates that the first radio resource set corresponds to P spatial relation(s), P being a positive integer; the second-type signaling is used for activating one of the K information units; the first radio resource block is used for determining the first time window;
or, the first condition set comprises a first condition subset, a second condition subset and a third condition subset; the first condition subset comprising that the first parameter is not configured and that a second-type signaling is received in a first time window; the second condition subset comprises that the first parameter is configured and that K is no greater than P;
the third condition subset comprises that the first parameter is configured, K is greater than P and that a second-type signaling is received in a first time window; the first parameter indicates that the first radio resource set corresponds to P spatial relation(s), P being a positive integer; the second-type signaling is used for activating one of the K information units; the first radio resource block is used for determining the first time window.

4. The first node according to claim 3, wherein whether essential conditions for ensuring that one or more information units of the K information units are used for determining the spatial relation corresponding to the operation performed in the first radio resource block include receiving the second-type signaling in the first time window is related to the first parameter.

5. The first node according to claim 3, wherein if the first parameter is not configured, the second-type signaling is used for activating one and only one information unit of the K information units; if the first parameter is configured, the second-type signaling is used for activating one or more information units of the K information units.

6. The first node according to claim 3, wherein the first condition set comprises a fourth condition subset, the fourth condition subset comprising that the first parameter is configured; if the fourth condition subset is fulfilled but neither of the second condition subset and the third condition subset is fulfilled, P information unit(s) of the K information units is (are) used for determining the spatial relation corresponding to the operation performed in the first radio resource block, and each of the P information unit(s) has a default position in the K information units; if neither of the fourth condition subset and the first condition subset is fulfilled, a first reference signal resource is used for determining the spatial relation corresponding to the operation performed in the first radio resource block; the first reference signal resource is unrelated to the K information units.

7. The first node according to claim 1, wherein the first receiver receives a second information block; wherein the second information block is used for configuring the first parameter.

8. A second node for wireless communications, comprising:
a first transmitter, transmitting a first information block; and
a second processor, processing first-type information in a first radio resource block;
wherein the first information block is used for determining a first radio resource set and K information units, K being a positive integer greater than 1; the first radio resource block belongs to the first radio resource set; the K information units respectively indicate K spatial relations; a first condition set is used for determining whether a spatial relation corresponding to an operation performed in the first radio resource block is related to the K information units; the first condition set is related to a first parameter, and the first parameter is used for determining whether the first radio resource set corresponds to multiple spatial relations; when the spatial relation corresponding to the operation performed in the first radio resource block is related to the K information units, one or more information units of the K information units are used for determining the spatial relation corresponding to the operation performed in the first radio resource block; the processing is transmitting, or the processing is receiving; when the processing is transmitting, the operating is monitoring, a target receiver of the first-type information monitors the first-type information in the first radio resource block; when the processing is receiving, the operating is transmitting, a transmitter of the first-type information transmits the first-type information in the first radio resource block; when the operating is monitoring, the first radio resource block comprises at least one PDCCH candidate, and the first-type information comprises DCI; when the operating is transmitting, the first radio resource block is a PUCCH resource, and the first-type information comprises UCI; the first condition set comprises M condition subsets, M being a positive integer greater than 1; when one condition subset in the first condition set is fulfilled, one or more information units of the K information units are used for determining the spatial relation corresponding to the operation performed in the first radio resource block; when none of condition subsets in the first condition set is fulfilled, a first reference signal resource is used for determining the spatial relation corresponding to the operation performed in the first radio resource block, and the first reference signal resource is unrelated to the K information units.

9. The second node according to claim 8, wherein when K1 information units of the K information units are used for determining the spatial relation corresponding to the operation performed in the first radio resource block and K1 is a positive integer greater than 1 the first radio resource block is divided into K1 resource sub-blocks, and the K1 information units are used for respectively determining the spatial relations corresponding to the operation performed in the K1 resource sub-blocks.

10. The second node according to claim 8, wherein the first condition set comprises a first condition subset, the first condition subset comprising that the first parameter is not configured and that a second-type signaling is received in a first time window; the second-type signaling is used for activating one of the K information units; the first radio resource block is used for determining the first time window;
or, the first condition set comprises a second condition subset and a third condition subset; the second condition subset comprises that the first parameter is configured and that K is no greater than P; the third condition subset comprises that the first parameter is configured, K is greater than P and that a second-type signaling is received in a first time window; the first parameter indicates that the first radio resource set corresponds to P spatial relation(s), P being a positive integer; the second-type signaling is used for activating one of the K information units; the first radio resource block is used for determining the first time window;
or, the first condition set comprises a first condition subset, a second condition subset and a third condition subset; the first condition subset comprising that the first parameter is not configured and that a second-type signaling is received in a first time window; the second condition subset comprises that the first parameter is configured and that K is no greater than P; the third condition subset comprises that the first parameter is configured, K is greater than P and that a second-type signaling is received in a first time window; the first parameter indicates that the first radio resource set corresponds to P spatial relation(s), P being a positive integer; the second-type signaling is used for activating one of the K information units; the first radio resource block is used for determining the first time window.

11. The second node according to claim 10, wherein whether essential conditions for ensuring that one or more information units of the K information units are used for determining the spatial relation corresponding to the operation performed in the first radio resource block include receiving the second-type signaling in the first time window is related to the first parameter.

12. The second node according to claim 10, wherein if the first parameter is not configured, the second-type signaling is used for activating one and only one information unit of the K information units; if the first parameter is configured, the second-type signaling is used for activating one or more information units of the K information units.

13. The second node according to claim 10, wherein the first condition set comprises a fourth condition subset, the fourth condition subset comprising that the first parameter is configured; if the fourth condition subset is fulfilled but neither of the second condition subset and the third condition subset is fulfilled, P information unit(s) of the K information units is (are) used for determining the spatial relation corresponding to the operation performed in the first radio resource block, and each of the P information unit(s) has a default position in the K information units; if neither of the fourth condition subset and the first condition subset is fulfilled, a first reference signal resource is used for determining the spatial relation corresponding to the operation performed in the first radio resource block; the first reference signal resource is unrelated to the K information units.

14. The second node according to claim 8, wherein the first transmitter transmits a second information block; herein, the second information block is used for configuring the first parameter.

15. A method in a first node for wireless communications, comprising:
receiving a first information block; and
operating first-type information in a first radio resource block;
wherein the first information block is used for determining a first radio resource set and K information units, K being a positive integer greater than 1; the first radio resource block belongs to the first radio resource set; the K information units respectively indicate K spatial relations; a first condition set is used for determining whether a spatial relation corresponding to the operation performed in the first radio resource block is related to the K information units; the first condition set is related to a first parameter, and the first parameter is used for determining whether the first radio resource set corresponds to multiple spatial relations; when the spatial relation corresponding to the operation performed in the first radio resource block is related to the K information units, one or more information units of the K information units are used for determining the spatial relation corresponding to the operation performed in the first radio resource block; the operating is monitoring, or the operating is transmitting; when the operating is monitoring, the first radio resource block comprises at least one PDCCH candidate, and the first-type information comprises DCI; when the operating is transmitting, the first radio resource block is a PUCCH resource, and the first-type information comprises UCI; the first condition set comprises M condition subsets, M being a positive integer greater than 1; when one condition subset in the first condition set is fulfilled, one or more information units of the K information units are used for determining the spatial relation corresponding to the operation performed in the first radio resource block; when none of condition subsets in the first condition set is fulfilled, a first reference signal resource is used for determining the spatial relation corresponding to the operation performed in the first radio resource block, and the first reference signal resource is unrelated to the K information units.

16. The method according to claim 15, wherein when K1 information units of the K information units are used for determining the spatial relation corresponding to the operation performed in the first radio resource block and K1 is a positive integer greater than 1, the first radio resource block is divided into K1 resource sub-blocks, and the K1 information units are used for respectively determining the spatial relations corresponding to the operation performed in the K1 resource sub-blocks.

17. The method according to claim 15, wherein the first condition set comprises a first condition subset, the first condition subset comprising that the first parameter is not configured and that a second-type signaling is received in a first time window; the second-type signaling is used for activating one of the K information units; the first radio resource block is used for determining the first time window;
or, the first condition set comprises a second condition subset and a third condition subset; the second condition subset comprises that the first parameter is configured and that K is no greater than P; the third condition subset comprises that the first parameter is configured, K is greater than P and that a second-type signaling is received in a first time window; the first parameter indicates that the first radio resource set corresponds to P spatial relation(s), P being a positive integer; the second-type signaling is used for activating one of the K information units; the first radio resource block is used for determining the first time window;
or, the first condition set comprises a first condition subset, a second condition subset and a third condition subset; the first condition subset comprising that the first parameter is not configured and that a second-type signaling is received in a first time window; the second condition subset comprises that the first parameter is configured and that K is no greater than P; the third condition subset comprises that the first parameter is configured, K is greater than P and that a second-type signaling is received in a first time window; the first parameter indicates that the first radio resource set corresponds to P spatial relation(s), P being a positive integer; the second-type signaling is used for activating one of the K information units; the first radio resource block is used for determining the first time window.

18. The method according to claim 17, wherein whether essential conditions for ensuring that one or more information units of the K information units are used for determining the spatial relation corresponding to the operation performed in the first radio resource block include receiving the second-type signaling in the first time window is related to the first parameter;
or, if the first parameter is not configured, the second-type signaling is used for activating one and only one information unit of the K information units; if the first parameter is configured, the second-type signaling is used for activating one or more information units of the K information units.

19. The method according to claim 17, wherein the first condition set comprises a fourth condition subset, the fourth condition subset comprising that the first parameter is configured; if the fourth condition subset is fulfilled but neither of the second condition subset and the third condition subset is fulfilled, P information unit(s) of the K information units is (are) used for determining the spatial relation corresponding to the operation performed in the first radio resource block, and each of the P information unit(s) has a default position in the K information units; if neither of the fourth condition subset and the first condition subset is fulfilled, a first reference signal resource is used for determining the spatial relation corresponding to the operation performed in the first radio resource block; the first reference signal resource is unrelated to the K information units.

20. The method according to claim 15, comprising:
receiving a second information block;
wherein the second information block is used for configuring the first parameter.

* * * * *